(12) United States Patent  
Eguchi

(10) Patent No.: US 7,941,630 B2  
(45) Date of Patent: May 10, 2011

(54) STORAGE SYSTEM FOR A STORAGE POOL AND VIRTUAL VOLUMES

(75) Inventor: Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/915,476

(22) Filed: Oct. 29, 2010

(65) Prior Publication Data

US 2011/0047344 A1  Feb. 24, 2011

Related U.S. Application Data

(62) Division of application No. 11/202,033, filed on Aug. 12, 2005.

(30) Foreign Application Priority Data

Jun. 2, 2005   (JP) ................................. 2005-162448

(51) Int. Cl.  
G06F 12/00 (2006.01)

(52) U.S. Cl. . 711/203; 711/162; 711/209; 711/E12.103; 711/E12.016; 711/114; 711/156

(58) Field of Classification Search .................. None  
See application file for complete search history.

(56) References Cited

U.S. PATENT DOCUMENTS

| | | | |
|---|---|---|---|
| 6,654,830 B1 | 11/2003 | Taylor et al. |
| 6,725,328 B2 | 4/2004 | Kano et al. |
| 6,874,092 B1 | 3/2005 | Motoyama et al. |
| 7,200,664 B2 | 4/2007 | Hayden |
| 7,577,817 B2 | 8/2009 | Karpoff et al. |
| 2003/0145167 A1 | 7/2003 | Tomita |
| 2003/0204597 A1 | 10/2003 | Arakawa et al. |
| 2004/0008554 A1 | 1/2004 | Kanamori et al. |
| 2004/0044827 A1 | 3/2004 | Carlson |
| 2004/0230766 A1 | 11/2004 | Cameron |
| 2005/0033915 A1 | 2/2005 | Matsunami et al. |
| 2005/0071379 A1 | 3/2005 | Kekre et al. |
| 2005/0071559 A1 | 3/2005 | Tamura et al. |
| 2005/0108292 A1 | 5/2005 | Burton et al. |
| 2005/0210210 A1 | 9/2005 | Arai et al. |
| 2006/0153192 A1 | 7/2006 | Pohlabel et al. |
| 2006/0242378 A1 | 10/2006 | Kano |

FOREIGN PATENT DOCUMENTS

| | | |
|---|---|---|
| EP | 1357465 | 10/2003 |
| EP | 1357476 | 10/2003 |
| JP | 2003-015915 | 1/2003 |
| JP | 2003316522 | 11/2003 |

OTHER PUBLICATIONS

Extended European Search Report, Nov. 23, 2006, for corresponding European Patent Application No. 06251234.8.  
European Office Action, Oct. 23, 2007, issued in correspoding European Patent Application No. 06251234.8.  
Geoffrey Hough, "3PAR Thin Provisioning, Eliminating Allocated - But- Unused Storage and Accelerating ROI", Jun. 2003, pp. 1-14.  
Notification of Reasons for Refusal, dated Nov. 16, 2010, issued in corresponding Japanese Patent Application No. 2005-162448 along with English language translation.

*Primary Examiner* — Reginald G Bragdon  
*Assistant Examiner* — Aracelis Ruiz  
(74) *Attorney, Agent, or Firm* — Brundidge & Stanger, P.C.

(57) ABSTRACT

This invention provides a storage system to store data used by computers. A storage system coupled to a computer and a management apparatus, includes storage devices accessed by the computer and a control unit that controls the storage devices, in which the control unit performs the following operations: setting, in the storage devices, a first virtual device including a first logical device; setting a second virtual device which including a second logical device, which is a virtual volume accessed by the computer; allocating an address of the first logical device to the second logical device; and changing the allocation to change storage areas of the virtual volume.

20 Claims, 32 Drawing Sheets

POOL MANAGEMENT INFORMATION

STORAGE SYSTEM FOR A STORAGE POOL AND VIRTUAL VOLUMES

CLAIM OF PRIORITY

The present application claims priority from Japanese application P2005-162448 filed on Jun. 2, 2005 and is a divisional application of U.S. patent application Ser. No. 11/202,033, filed Aug. 12, 2005, the contents of which are hereby incorporated by reference into this application.

BACKGROUND

This invention relates to a storage system to store data used by computers and, and more specifically to a storage system that allows the capacity of storage accessed by computers to be changed.

The storage capacity of a conventional storage system depends on the capacity of disk drives or other similar physical devices installed in the system. Therefore, when required to have a large storage capacity, a storage system has to be equipped with an accordingly large number of physical devices. While there is a demand for a large storage capacity, users also make a conflicting demand for reduction in cost and size.

Here comes an urgent need to develop a mechanism that enables a storage system to change its storage capacity dynamically. One of methods known to be useful in building such a storage system is automatic storage device capacity expansion (see JP 2003-15915 A, for example). In this method, a logical block address in a read or write I/O request at which a host computer accesses a logical volume of a storage device is monitored. Then, with the obtained logical block address as the key, the storage area of the logical volume is dynamically expanded. This method also allows a command unit of a host computer to send a logical volume capacity reduction/expansion instruction to a volume server, which then reduces/expands the storage area of the logical volume.

SUMMARY

The prior art publication discloses that the capacity of a device accessed by a host computer can be changed dynamically, but not how the technique is applied. In particular, the prior art publication does not disclose how logical volumes are set in virtual volumes and how the set volumes are to be utilized in the case where virtual volumes are utilized for a storage system.

This invention has been made in view of the above problems, and it is therefore an object of this invention to provide a computer system capable of changing the storage capacity of a storage system that utilizes virtual volumes.

According to an embodiment of this invention, there is provided a storage system connected to a computer and a management apparatus, including storage devices accessed by the computer and a control unit that controls the storage devices, in which the control unit performs the following operations: setting, in the storage devices, a first virtual device containing a first logical device; setting a second virtual device which containing a second logical device, which is a virtual volume accessed by the computer; allocating an address of the first logical device to the second logical device; and changing the allocation to change storage areas of the virtual volume.

According to this invention, the storage areas of virtual volumes accessed by computers can be changed dynamically by changing allocation of logical volumes to the virtual volumes and thus giving the virtual volumes different storage areas. This makes it possible to set virtual volumes whose capacity exceeds the total storage capacity of physical devices provided in a storage system, and enhances the degree of freedom to access data in a computer system.

DETAILED DESCRIPTION OF THE PREFERRED EMBODIMENTS

Embodiments of this invention will be described below with reference to the accompanying drawings.

First Embodiment

Figure 1:
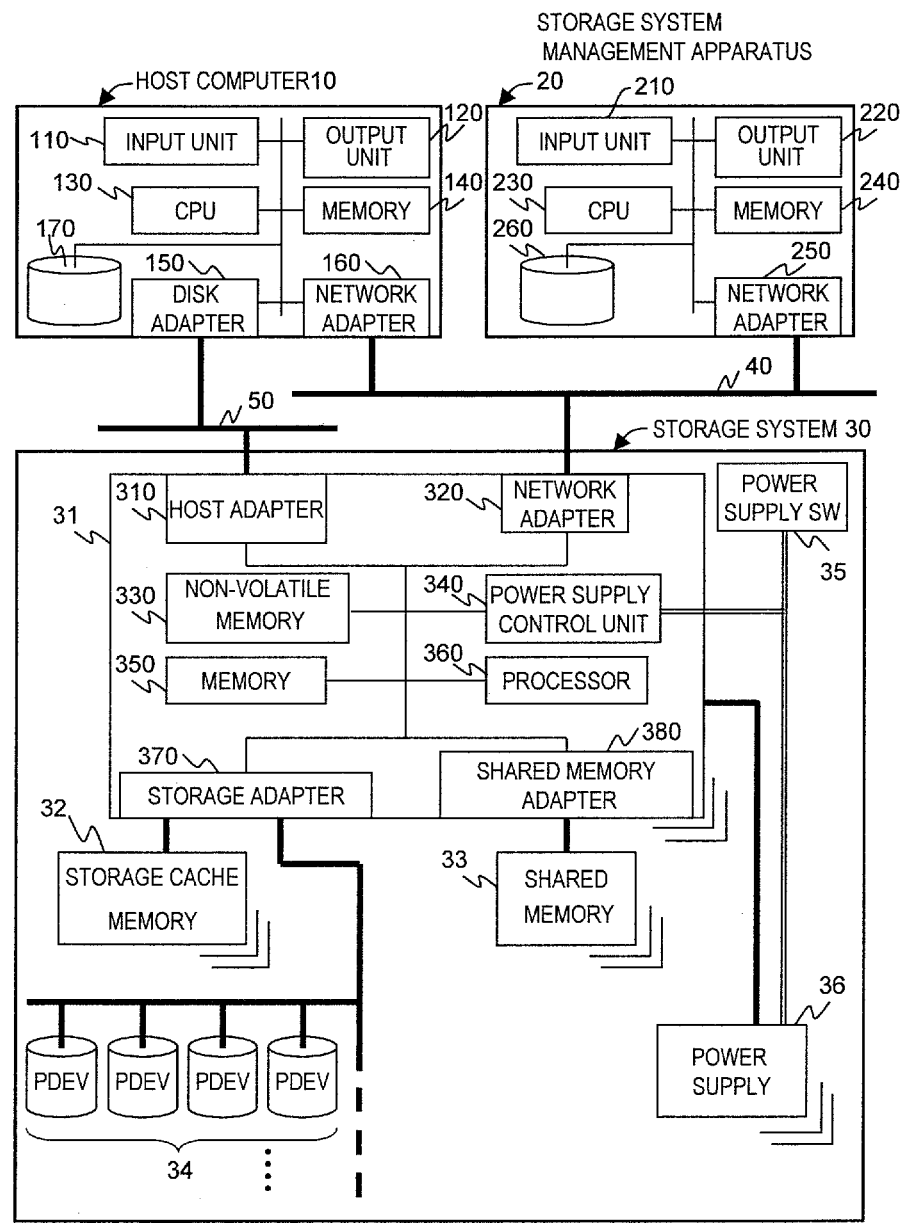
FIG. 1 is a configuration block diagram of a computer system according to a first embodiment of this invention.

FIG. 1 is a configuration block diagram of a computer system according to a first embodiment of this invention.

The computer system of this embodiment has a host computer 10 and a storage system management apparatus 20 which are connected to a storage system 30.

The host computer 10 accesses data in the storage area of the storage system 30. The storage system management apparatus 20 manages the configuration of the storage area of the storage system 30. The storage system 30 has physical devices 34, 34, 34 . . . , and stores data in storage areas set in the physical devices 34, 34, 34 . . . .

The host computer 10 has an input unit 110, an output unit 120, a CPU 130, a memory 140, a disk adapter 150, a network adapter 160 and a disk drive 170.

The input unit 110 accepts an input made by an administrator or the like who operates the host computer 10. The input unit 110 is, for example, a keyboard. The output unit 120 is a unit that displays the state and setting items of the host computer 10. The output unit 120 is, for example, a display device.

The CPU 130 reads a program stored in the disk drive 170 and loads the program into the memory 140 to execute processing prescribed in the program. The memory 140 is, for example, a RAM, and stores a program, data, and the like.

The disk adapter 150 is connected to the storage system 30 via a storage network 50 to exchange data with the storage system 30. A protocol suitable for data transfer (Fibre Channel, for example) is employed for the storage network 50.

The network adapter 160 exchanges data with the storage system management apparatus 20 or with the storage system 30 via a management network 40. The management network 40 is, for example, Ethernet.

The disk drive 170 is, for example, a hard disk, and stores data and a program.

The storage system management apparatus 20 has an input unit 210, an output unit 220, a CPU 230, a memory 240, a network adapter 250 and a disk drive 260.

The input unit 210 accepts an input made by an administrator or the like who operates the storage system management apparatus 20. The input unit 210 is, for example, a keyboard. The output unit 220 is a unit that displays the state and setting items of the storage system management apparatus 20. The output unit 220 is, for example, a display device.

The CPU 230 reads a program stored in the disk drive 260 and loads the program into the memory 240 to execute processing prescribed in the program. The memory 240 is, for example, a RAM, and stores a program, data, and the like.

The network adapter 250 exchanges data with the host computer 10 or with the storage system 30 via the management network 40.

The disk drive 260 is, for example, a hard disk, and stores data and a program.

The storage system 30 has a control unit 31, a storage cache memory 32, a shared memory 33, the physical devices (PDEVs) 34, 34, 34 . . . , a power supply switch 35 and a power supply 36.

The control unit 31 controls which data is to be stored in which storage area set in the PDEVs 34, 34, 34 . . . .

The storage cache memory 32 temporarily stores data to be read out or written in the PDEVs 34, 34, 34 . . . . The shared memory 33 stores configuration information of the control unit 31 and the PDEVs 34, 34, 34 . . . .

The PDEVs 34, 34, 34 . . . includes plural disk devices.

The power supply 36 supplies electric power to each component of the storage system 30. The power supply switch 35 is a switch to turn on/off a supply of electric power from the power supply 36.

The control unit 31 has a host adapter 310, a network adapter 320, a non-volatile memory 330, a power supply control unit 340, a memory 350, a processor 360, a storage adapter 370 and a shared memory adapter 380.

The host adapter 310 exchanges data with the host computer 10 via the storage network 50. The network adapter 320 exchanges data with the host computer 10 or with the storage system management apparatus 20 via the management network 40.

The non-volatile memory 330 is, for example, a hard disk or a flash memory, and stores a program run on the control unit 31, configuration information, and the like.

The power supply control unit 340 controls electric power supplied from the power supply 36.

The memory 350 is, for example, a RAM, and stores a program, data, and the like.

The processor 360 reads a program stored in the non-volatile memory 330 and loads the program into the memory 350 to execute processing prescribed in the program.

The storage adapter 370 exchanges data with the PDEVs 34, 34, 34 . . . and with the storage cache memory 32.

The shared memory adapter 380 exchanges data with the shared memory 33.

A storage pool according to this embodiment is described next.

Figure 2:
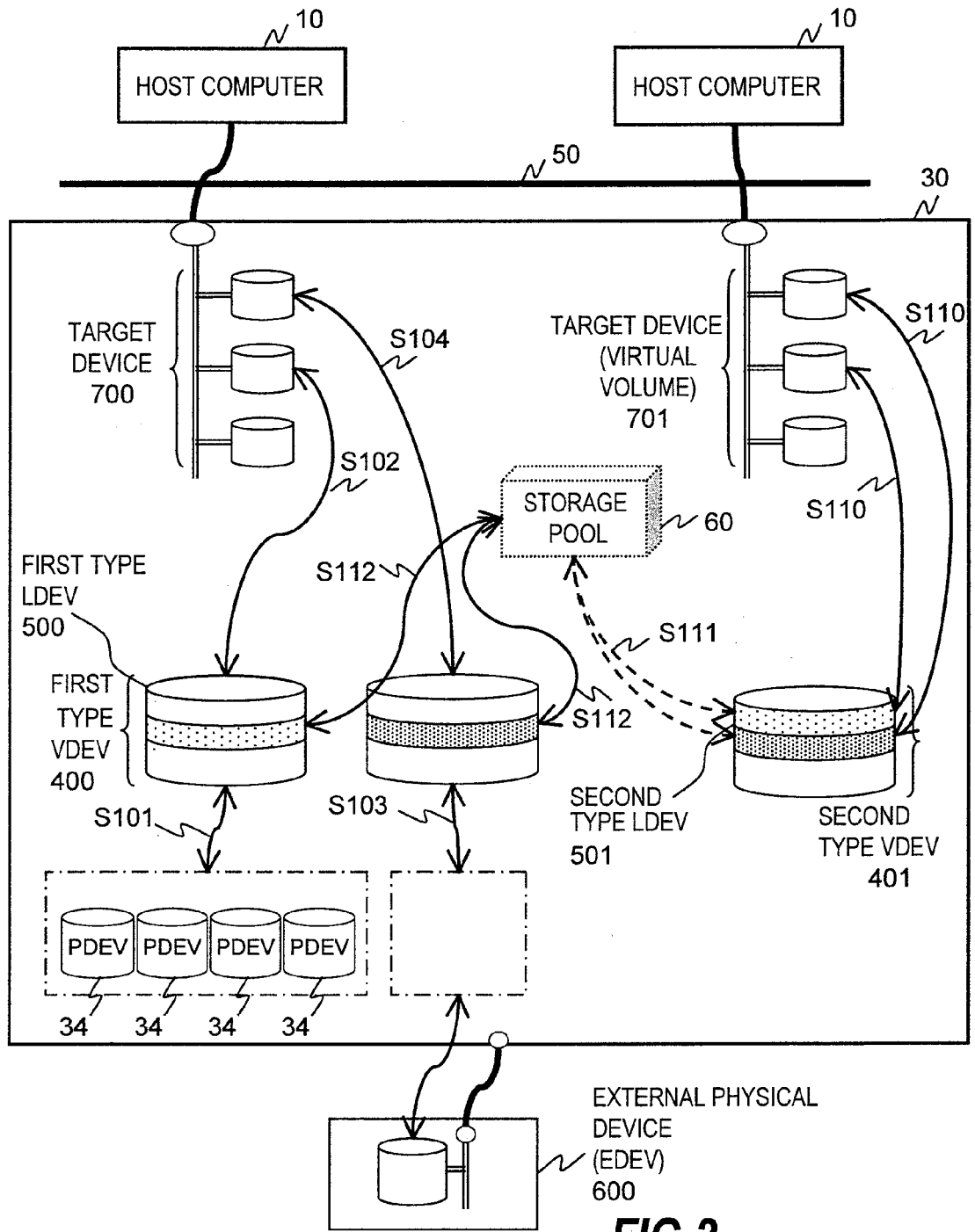
FIG. 2 is an explanatory diagram of a storage area in the computer system according to the first embodiment of this invention.

FIG. 2 is an explanatory diagram of a storage area in the computer system according to this embodiment.

The host computer 10 accesses a storage area at a volume of the storage system 30. One of LDEVs is set to the volume.

In the storage system 30, the PDEVs 34, 34, 34 . . . take a RAID configuration to constitute a RAID group. The RAID group constitutes a virtual device (VDEV) 400 (S101). The VDEV 400 is divided into plural logical devices (LDEVs) 500, 500, 500 . . . , which are storage areas.

The VDEV constituted of the PDEVs 34, 34, 34 . . . will hereinafter be called as a "first type VDEV". LDEVs contained in the first type VDEV will hereinafter be called as "first type LDEVs".

Access from the host computer 10 is directed at a volume of the storage system 30. A volume recognized by the host computer 10 is called as a "target device". A target device, which is denoted by 700, is set in a volume containing the first type LDEV 500 by defining a path to the host computer 10 (S102).

An external device 600 connected to the storage system 30 from the outside may be treated like the PDEV 34. In this case, plural external devices (EDEVs) 600, 600, 600 . . . take a RAID configuration to constitute plural first type VDEVs 400, 400, 400 . . . (S103). The first type VDEVs 400, 400, 400 . . . are divided into one or more first type LDEVs 500, 500, 500 . . . , which are storage areas. A path to the host computer 10 is set to the first type LDEV 500, thereby setting the target device 700 (S104).

A second type VDEV 401 may be set in the storage system 30. The second type VDEV is, unlike the first type VDEV constituted of the PDEVs 34, 34, 34 . . . , a virtual device that has an address and an area but not areas corresponding to the PDEVs 34, 34, 34 . . . . Instead, the second type VDEV can have a corresponding cache memory area. The second type VDEV 401 is broken into one or more LDEVs, which are called as second type LDEVs and denoted by 501.

A target device 701 is set by setting a path to the host computer 10 to the second type LDEV 501 (S110). This target device is called as a virtual volume.

The second type VDEV and the second type LDEVs are not physical entities. In order for the host computer 10 to be able to use the second type VDEV and LDEVs, the second type LDEVs have to be associated with a storage pool.

A storage pool is built by setting the above-described first type LDEV 500 as an attribute of the storage pool (S112). The first type LDEV 500 set to the storage pool is associated with the second type LDEV 501 and the address is mapped (S111). This enables the host computer 10 to use second type LDEVs, which are storage areas of a virtual volume. Mapping first type LDEVs and second type LDEVs differently makes a change in storage area of a virtual volume.

Hereinafter, a reference to "VDEV" without a mention of a type includes first type VDEV and second type VDEV both. Similarly, a reference to "LDEV" without a mention of a type includes first type LDEV and second type LDEV both.

Figure 3:
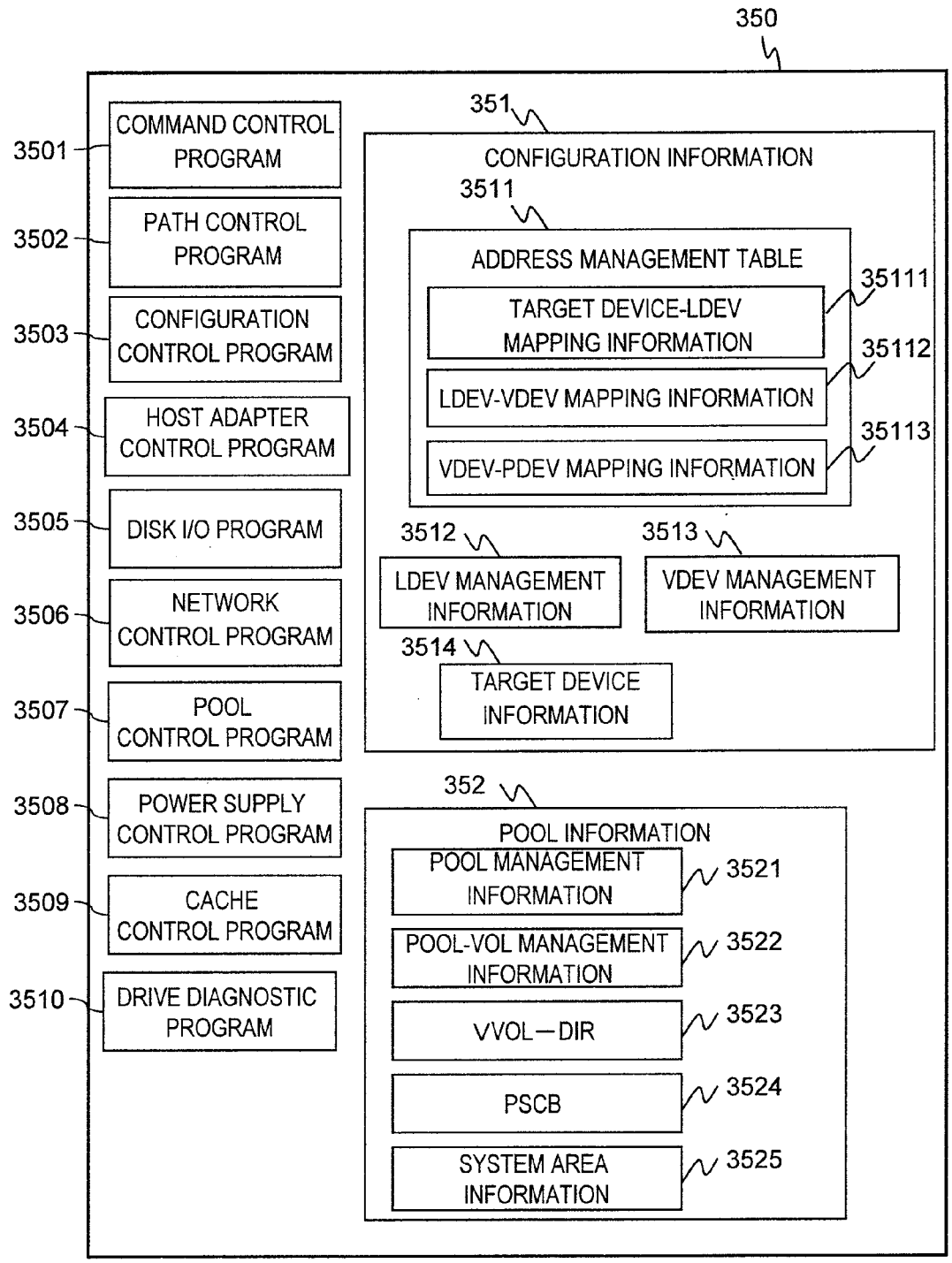
FIG. 3 is a block diagram of a memory according to the first embodiment of this invention.

FIG. 3 is a block diagram of the memory 350 in the control unit 31 of the storage system 30.

The memory 350 stores various programs read and executed by the processor 360, configuration information 351 related to settings of LDEVs, and pool information 352 related to settings of a storage pool.

A command control program 3501 interprets a command from the host computer 10 or the storage system management apparatus 20, and executes processing prescribed in the command.

A path control program 3502 sets a path to the host computer 10.

A configuration control program 3503 controls the configuration of the storage system 30.

A host adapter control program 3504 controls data inputted and outputted by the host adapter 310.

A disk I/O program 3505 controls access to the PDEVs 34, 34, 34 . . . .

A network control program 3506 controls data sent and received via the storage network 50 or the management network 40.

A pool control program 3507 sets a storage pool.

A power supply control program 3508 controls turn on/off of electric power supplied by the power supply 36.

A cache control program 3509 controls the area and data of the storage cache memory 32.

A drive diagnostic program 3510 diagnoses the state of each disk device listed as the PDEVs 34, 34, 34 . . . .

The configuration information 351 holds settings related to VDEVs and LDEVs of the storage system 30.

The pool information 352 holds settings related to a storage pool.

The configuration information 351 contains an address management table 3511, LDEV management information 3512, target device information 3513 and VDEV management information 3514.

The address management table 3511 holds mapping information in which addresses of target devices, LDEVs, VDEVs, and physical devices are mapped out. The address management table 3511 includes target device-LDEV mapping information 35111, LDEV-VDEV mapping information 35112 and VDEV-PDEV mapping information 35113.

The LDEV management information 3512 holds information related to LDEVs.

The target device management information 3513 holds information of LDEVs in a volume to which a path to the host computer 10 is set.

The VDEV management information 3514 holds information related to virtual logical volumes.

The pool information 352 contains POOL management information 3521, POOL-VOL management information 3522, VVOL-DIR 3523, PSCB 3524, and system area information 3525.

The POOL management information 3521 holds settings of a storage pool. The POOL-VOL management information 3522 holds information on volumes of a storage pool. The VVOL-DIR 3523 holds allocation of addresses of LDEVs of a storage pool. The PSCB 3524 holds information on addresses of LDEVs of a storage pool. The system area information 3525 holds information of LDEVs where configuration information of the storage system 30 is stored.

Figure 4:
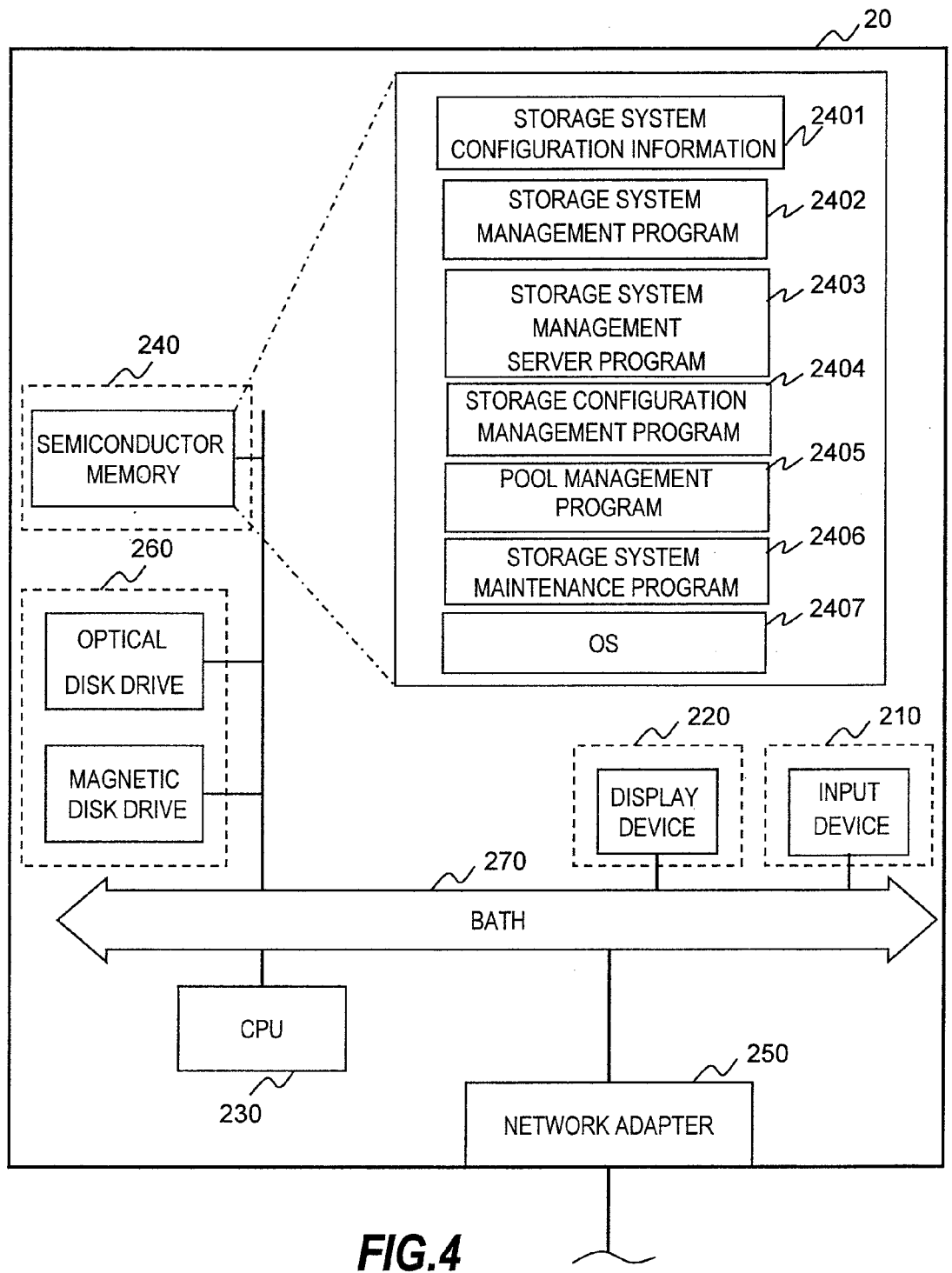
FIG. 4 is a configuration block diagram of a storage system management apparatus according to the first embodiment of this invention.

FIG. 4 is a more detailed block diagram showing the configuration of the storage system management apparatus 20.

The storage system management apparatus 20 has, as described above, the input unit 210, the output unit 220, the CPU 230, the memory 240, the network adapter 250 and the disk drive 260.

The input unit 210 has an input device 211. The output unit 220 has an output device 221.

The memory 240 has a semiconductor memory 241. The disk drive 260 has an optical disk drive 242 and a magnetic disk drive 243.

The CPU 230 reads a program or configuration information from the optical disk drive 242 or from the magnetic disk drive 243, and loads the program or the configuration information into the semiconductor memory 241 to execute processing prescribed in the program.

The input unit 210, the output unit 220, the CPU 230, the memory 240, the network adapter 250 and the disk drive 260 are connected to one another by a bus 270.

Programs and data loaded into and run on the memory 240 include storage system configuration information 2401, a storage system management program 2402, a storage system management server program 2403, a storage configuration management program 2404, a POOL management program 2405, a storage system maintenance program 2406 and an OS 2407.

The OS 2407 is the basic program of the storage system management apparatus 20. The rest of the programs are run on the OS 2407.

The storage system configuration information 2401 holds information on the configuration of the storage system 30.

The storage system management program 2402 manages the configuration of a storage constituted of logical volumes set in the storage system 30.

The storage system management server program 2403 receives a command to manage the configuration of a storing unit constituted of logical volumes set in the storage system 30.

The storage configuration management program 2404 manages the configuration of the storage system 30. Configuration information created through the operation of the storage configuration management program 2404 is stored as the storage system configuration information 2401.

The POOL management program 2405 manages the configuration of a storage pool of the storage system 30.

The storage system maintenance program 2406 maintains the storage system 30.

With those programs, the storage system management apparatus 20 sets and changes the configuration of the storage system 30 and maintains the storage system 30.

The programs and information stored in the memory 240 may instead be stored in the memory 140 of the host computer 10. In other words, programs stored in the host computer 10 may execute processing of setting or changing the configuration of the storage system 30.

In this case, the host computer 10 sends a command to a command device of the storage system 30. The command device is one of target devices of the storage system 30 that is chosen in advance. Receiving an I/O request directed to the command device from the host computer 10, the storage system 30 interprets the I/O request as an instruction command.

Figure 5:
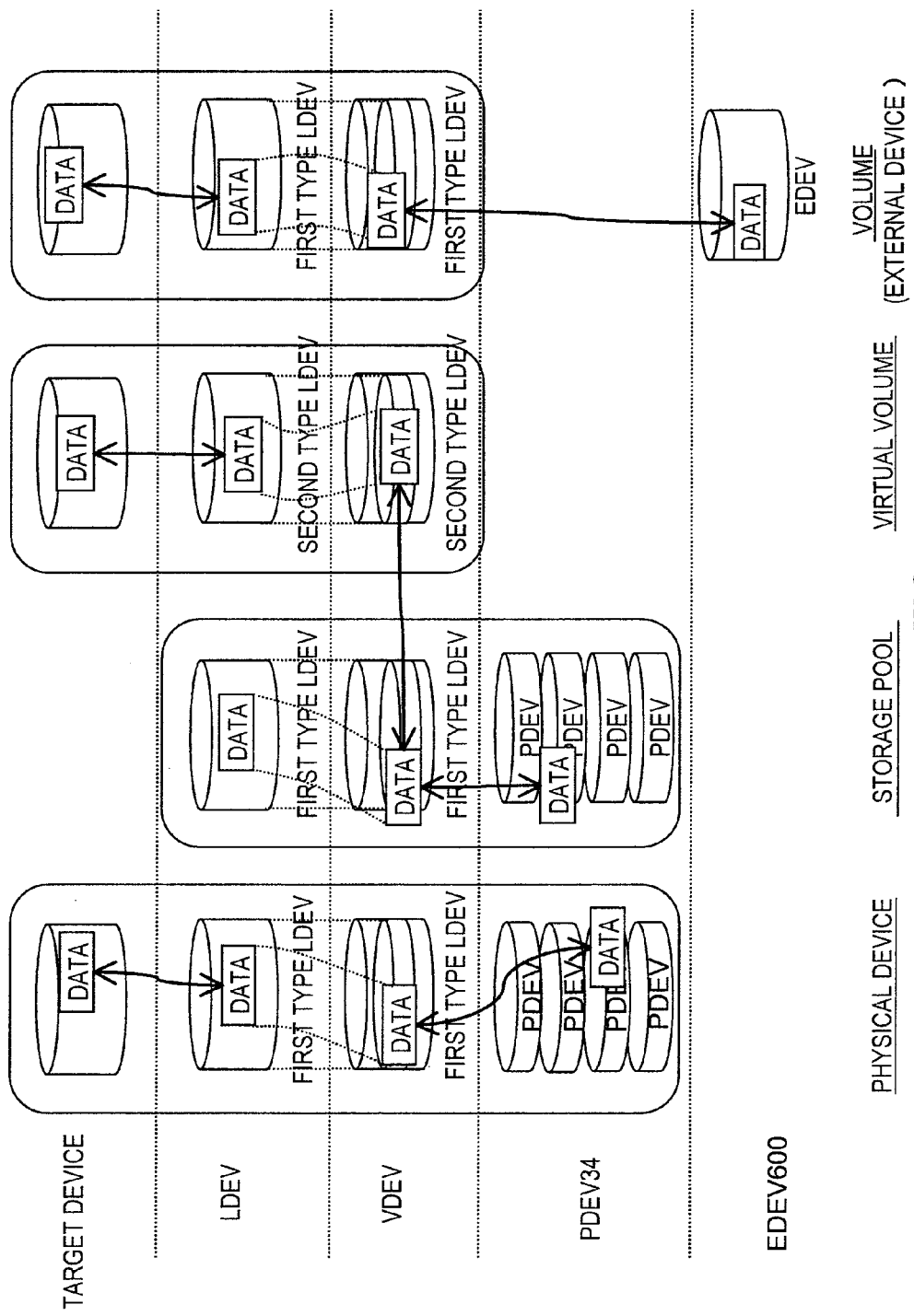
FIG. 5 is an explanatory diagram of volumes and LDEVs according to the first embodiment of this invention.

FIG. 5 is an explanatory diagram of target devices, LDEVs, and PDEVs.

The host computer 10 accesses the target device 700 set in the storage system 30. The storage area of the target device 700 is the first type LDEV 500 set as the target device 700.

The first type LDEV 500 is an area of the first type VDEV 400, which is constituted of physical volumes assuming a RAID configuration. The first type VDEV 400 is divided into one or more first type LDEVs 500, 500, 500 . . . .

The host computer 10 accesses, as the target device 701, a virtual volume set in the storage system 30. The storage area of the target device 701 is the second type LDEV 501.

The second type LDEV 501 is associated with the first type LDEV 500 set as a storage pool.

The host computer 10 accesses the target device 701, which is a virtual volume. The storage area of the virtual volume is the second type LDEV 501. When a request to access the second type LDEV 501 is received, the storage system 30 consults the address management table 3511 and changes the device to be accessed to the first type LDEV 500 that is associated with the second type LDEV 501.

Figure 6:
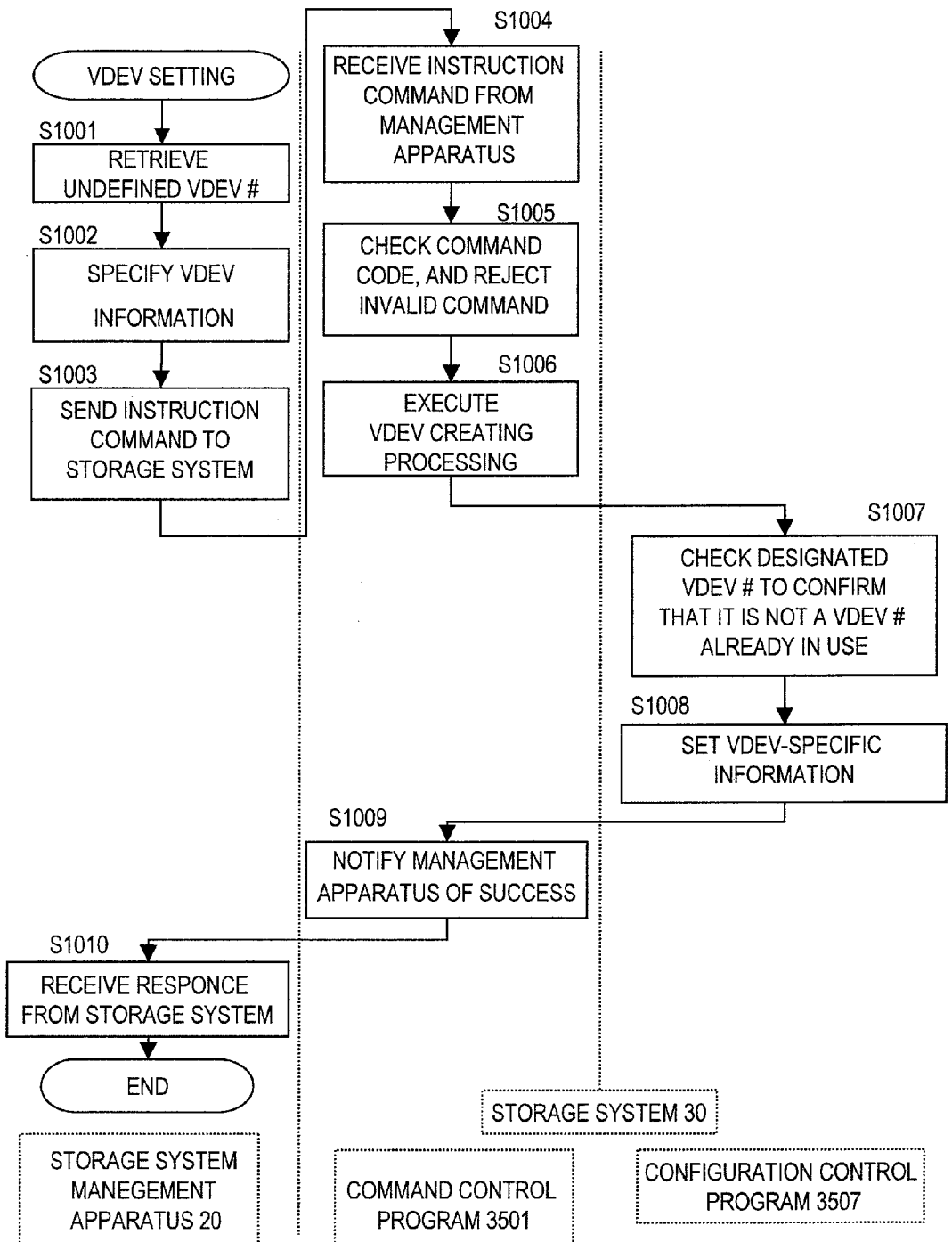
FIG. 6 is a flow chart for setting a VDEV according to the first embodiment of this invention.

FIG. 6 is a flow chart for setting a VDEV.

First, the storage configuration management program 2404 searches the storage system configuration information 2401 for the number of an undefined VDEV (VDEV #) (a step S1001).

The administrator operates the input unit 210 to set information of the VDEV. The administrator sets information necessary to set a first type VDEV or a second type VDEV. To set a first type VDEV, information on a RAID group of the PDEVs 34, 34, 34 . . . to be set to the first type VDEV and its emulation type are designated. To set a second type VDEV, an emulation type and a size are designated (a step S1002).

The storage configuration management program 2404 creates an instruction command containing the information set by the administrator to create a VDEV. The created instruction command is sent to the storage system 30 via the network adapter 250 (a step S1003).

In the storage system 30, an instruction command sent from the storage system management apparatus 20 is received by the command control program 3501 via the network adapter 320 (a step S1004). The command control program 3501 checks what is instructed by the received instruction command. In the case where the instruction is not valid, the instruction command is rejected (a step S1005).

When a received instruction command is about setting a VDEV, the command control program 3501 forwards the received instruction command to the configuration control program 3503. The configuration control program 3503 receives the instruction command and executes VDEV creating processing (a step S1006).

The configuration control program 3503 checks whether or not the VDEV number to which the instruction command is addressed is already in use (a step S1007). In the case where the VDEV number to which the instruction command is addressed is already in use, the instruction command is rejected.

Next, the configuration control program 3503 newly creates VDEV-specific information to be contained in the VDEV management information 3514. Information of the VDEV to be created as instructed by the instruction command is set to this VDEV-specific information. Specifically, when the VDEV to be created as instructed by the instruction command is a first type VDEV, the total size, the remaining size, and an emulation type are set to the VDEV-specific information based on the capacity of the designated RAID group. When the VDEV to be created as instructed by the instruction command is a second type VDEV, the designated size and emulation type are set to the VDEV-specific information and "virtual volume" is set as a device attribute (a step S1008). In this way, the VDEV to be created as instructed by the instruction command is set. To set this VDEV in a virtual volume, "virtual volume" is set as a device attribute.

Upon completion of the VDEV creating processing, the command control program 3501 notifies the storage system management apparatus 20 of the success of the command (a step S1009).

Received response from the storage system 30 (a step S1010), the storage configuration management program 2404 of the storage system management apparatus 20 ends the processing.

A VDEV is set through this processing.

Figure 7:
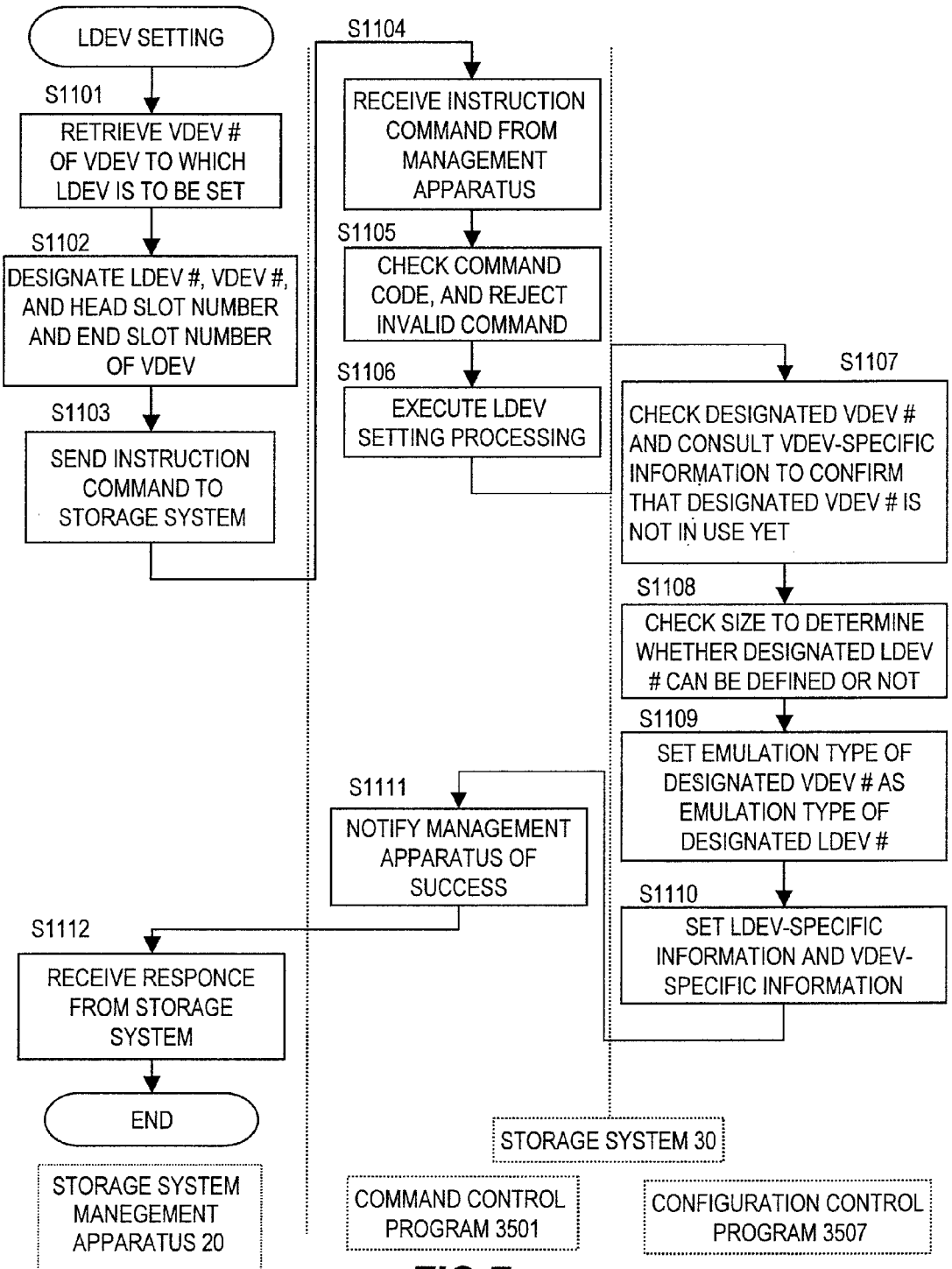
FIG. 7 is a flow chart for setting an LDEV according to the first embodiment of this invention.

FIG. 7 is a flow chart for setting an LDEV.

This processing is to set an LDEV, which is a storage area, in a VDEV. The VDEV in this processing may be the one set by the processing of FIG. 6, or may be an existing VDEV. The LDEV to be set may be a first type LDEV or a second type LDEV.

First, the storage configuration management program 2404 obtains the number of the VDEV (VDEV #) in which the LDEV is to be set (a step S1101). The VDEV number is the one set in the processing of FIG. 6 and is automatically set by the storage configuration management program 2404. Alternatively, the administrator designates a VDEV number that has already been set.

Next, the administrator operates the input unit 210 to designate information of the LDEV to be set. Specifically, information including the number of the LDEV to be set, the VDEV number, the head slot number of the VDEV, and the end slot number of the VDEV is set (a step S1102).

The storage configuration management program 2404 creates an instruction command containing the information set by the administrator to set the LDEV. The created instruction command is sent to the storage system 30 via the network adapter 250 (a step S1103).

In the storage system 30, an instruction command sent from the storage system management apparatus 20 is received by the command control program 3501 via the network adapter 320 (a step S1104). The command control program 3501 checks what is instructed by the received instruction command. In the case where the instruction is not valid, the instruction command is rejected (a step S1105).

When a received instruction command is about setting an LDEV, the command control program 3501 forwards the received instruction command to the configuration control program 3503. The configuration control program 3503 receives the instruction command and executes LDEV setting processing (a step S1106).

The configuration control program 3503 checks whether or not the VDEV number designated in the instruction command is already in use (a step S1107). In the case where the VDEV number designated in the instruction command is already in use, the instruction command is rejected.

Next, the configuration control program 3503 obtains, from the VDEV management information 3514, the total size of the VDEV designated in the instruction command. The configuration control program 3503 checks whether or not the size of the LDEV to be set as instructed by the instruction command can be defined in the VDEV (a step S1108). The size of the LDEV is calculated from the head slot number and the end slot number that are contained in the instruction command. In the case where the size of the LDEV cannot be defined, the instruction command is rejected.

The configuration control program 3503 then obtains, from the VDEV-specific information, the emulation type of the VDEV designated in the instruction command. The obtained emulation type is set as the emulation type of the LDEV to be set as instructed by the instruction command (a step S1109).

Next, the configuration control program 3503 sets LDEV-specific information for the LDEV number designated in the instruction command, and also sets VDEV-specific information for the VDEV number designated in the instruction command (a step S1110).

Specifically, the configuration control program 3503 newly creates LDEV-specific information for the LDEV number designated in the instruction command. The LDEV number, a head slot number, an end slot number, and a device attribute are defined and set to the LDEV-specific information. In the case where the LDEV to be set through this processing is a second type LDEV, "second type LDEV" is set as a device attribute. After the LDEV-specific information is set, VDEV-specific information is set for the VDEV number designated in the instruction command. Specifically, the count of set LDEVs is added up, and the LDEV number designated in the instruction command, the remaining size, a head LDEV slot, and an end LDEV slot are set. In this way, the LDEV to be set as instructed by the instruction command is set in the VDEV.

Upon completion of the LDEV setting processing, the command control program 3501 notifies the storage system management apparatus 20 of the success of the command (a step S1111).

Received response from the command by the storage system 30 (a step S1112), the storage configuration management program 2404 of the storage system management apparatus 20 ends the processing.

An LDEV is set in a VDEV through this processing.

Figure 8:
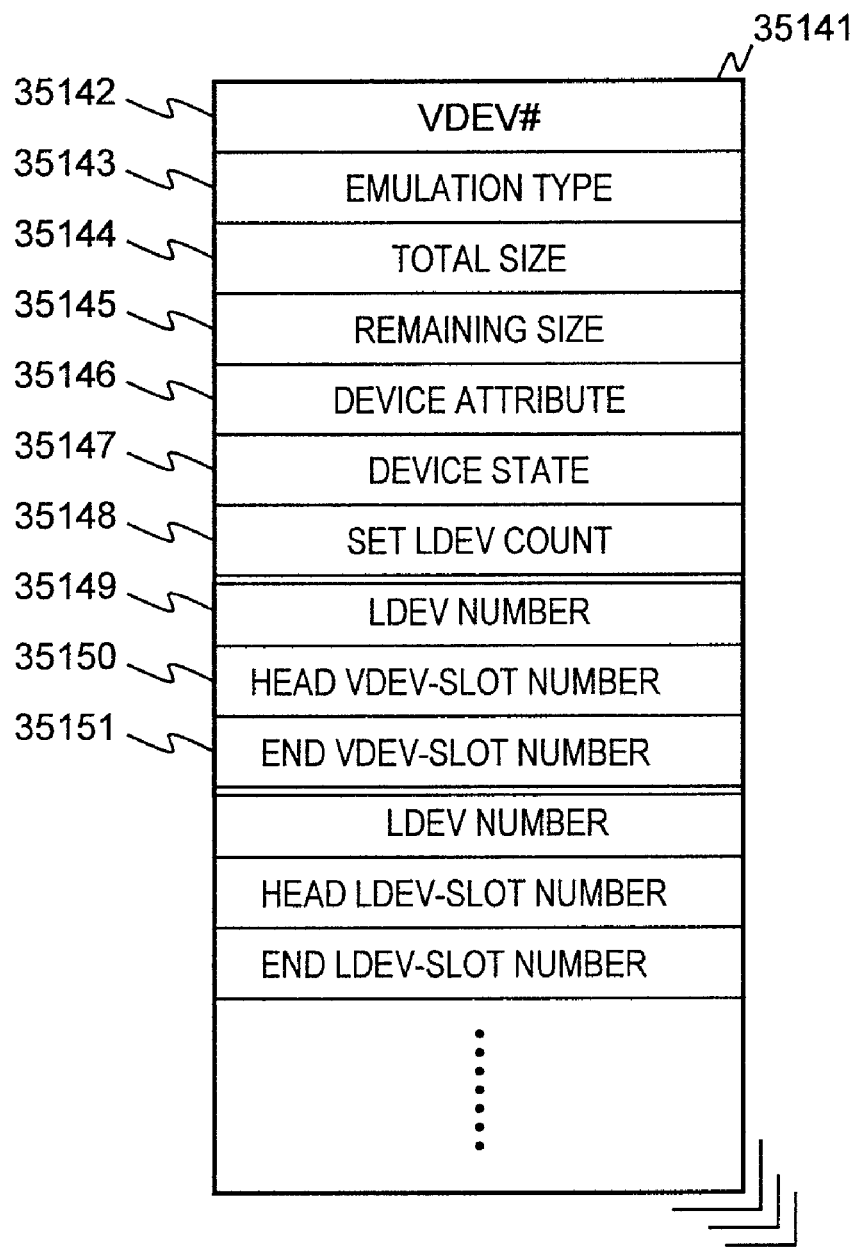
FIG. 8 is an explanatory diagram of VDEV management information according to the first embodiment of this invention.

FIG. 8 is an explanatory diagram of VDEV management information.

VDEV management information includes VDEV-specific information 35141.

The VDEV-specific information 35141 contains a VDEV number (VDEV #) 35142, an emulation type 35143, a total size 35144, a remaining size 35145, a device attribute 35146, a device state 35147, a set LDEV count 35148, an LDEV number 35149, a head VDEV-SLOT # 35150 and an end VDEV-SLOT # 35151.

Stored as the VDEV # 35142 is the identifier of a VDEV. Stored as the emulation type 35143 is the emulation type identifier of the VDEV. The total size 35144 indicates a total size set to the VDEV. The remaining size 35145 indicates the size of an unused area of the VDEV.

Stored as the device attribute 35146 is the identifier of an attribute set to the VDEV. In the case where the VDEV is a first type VDEV, an identifier showing that it is a first type VDEV and not a second type VDEV is stored as the device attribute 35146. In the case where the VDEV is a second type VDEV and is set in a virtual volume, an identifier showing that it is a second type VDEV and not a first type VDEV is stored as the device attribute 35146.

Stored as the device state 35147 is an identifier representing the state of the VDEV. A VDEV can be in a normal state, a blocked state, a failure-induced blocked state, and the like. The term "block" refers to blockage due to other factors than an occurrence of a failure such as a puncture block. The term "failure-induced block" refers to blockage due to a failure in one of the devices.

The set LDEV count 35148 indicates the total count of LDEVs set in the VDEV. Stored as the LDEV number 35149 is a number assigned to the LDEV that is set in the VDEV. Stored as the head VDEV-SLOT # 35150 is the identifier of a physical head slot number of an LDEV that is set in the VDEV. Stored as the end VDEV-SLOT # 35151 is the identifier of a physical end slot number of an LDEV that is set in the VDEV. The LDEV number 35149, the head VDEV-SLOT # 35150 and the end VDEV-SLOT # 35151 are set for each of the LEDV numbers of the set LDEVs which are as many as indicated by the set LDEV count 35148.

Figure 9:
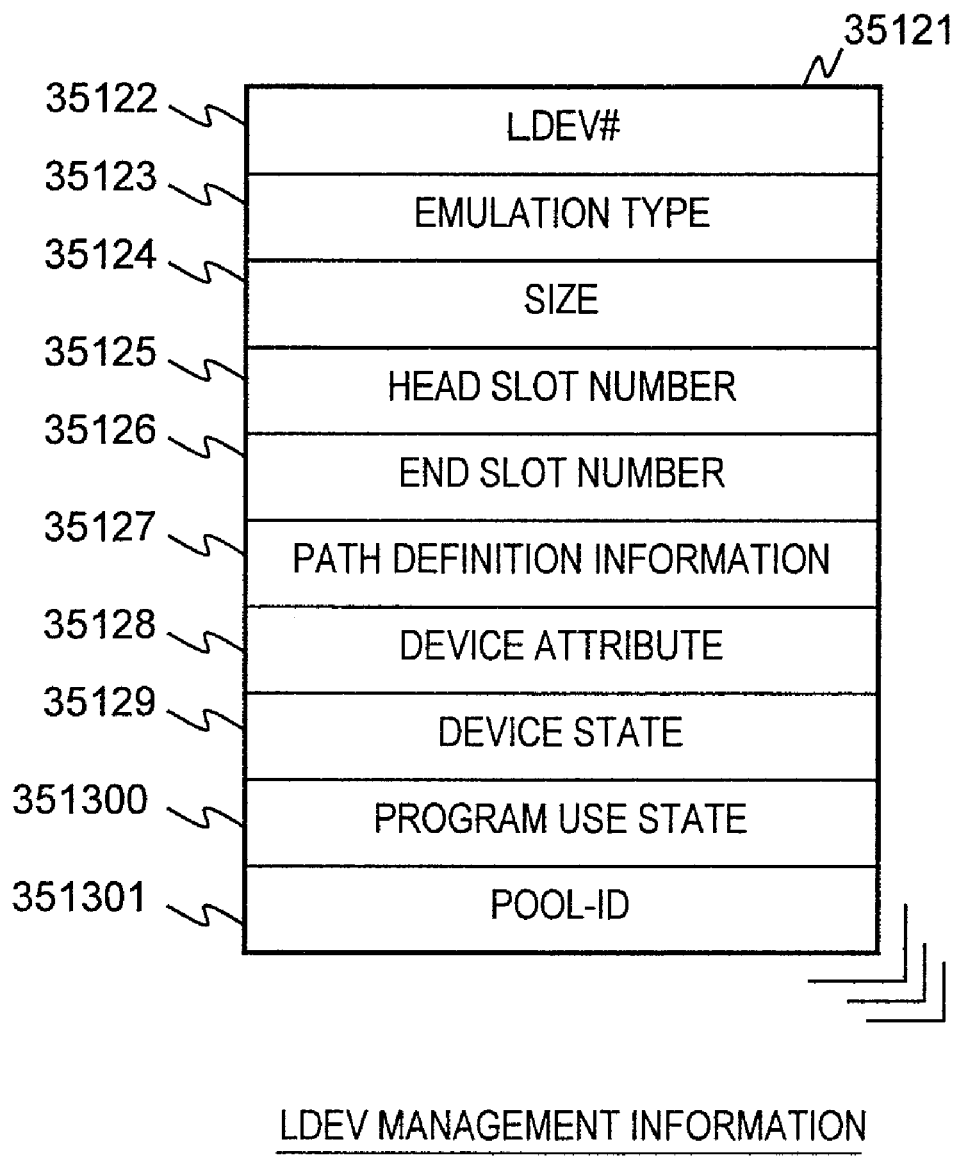
FIG. 9 is an explanatory diagram of LDEV management information according to the first embodiment of this invention.

FIG. 9 is an explanatory diagram of LDEV management information.

LDEV management information includes LDEV-specific information 35121.

The LDEV-specific information 35121 contains an LDEV number (LDEV #) 35122, an emulation type 35123, a size 35124, a head slot number 35125, an end slot number 35126, path definition information 35127, a device attribute 35128, a device state 35129, a program use state 351300 and a POL-ID 351301.

Stored as the LDEV # 35122 is the identifier of an LDEV. Stored as the emulation type 35123 is the emulation type identifier of the LDEV. The size 35124 indicates a total size set to the LDEV.

Stored as the head slot number 35125 is the identifier of a head slot number of the set LDEV. Stored as the end slot number 35126 is the identifier of a final slot number of the set LDEV. Stored as the path definition information 35127 is the identifier of a path defined in the host computer 10.

Stored as the device attribute 35128 is the identifier of an attribute of the LDEV. When the LDEV is a first type LDEV, an identifier showing that it is a first type LDEV and not a second type LDEV is stored as the device attribute 35128. When the LDEV is a second type LDEV, an identifier showing that it is a second type LDEV and not a first type LDEV is stored as the device attribute 35128. In the case where the LDEV is set in a storage pool, an identifier indicating a pool attribute is stored as the device attribute 35128.

Stored as the device state 35129 is an identifier representing the state of the VDEV to which the LDEV identified by the LDEV number 35122 belongs. A VDEV can be in a normal state, a blocked state, a failure-induced blocked state, and the like. The term "block" refers to blockage due to other factors than an occurrence of a failure such as a puncture block. The term "failure-induced block" refers to blockage due to a failure in one of the devices.

While the LDEV is being processed by one of the programs, the identifier of this program is stored as the program use state 351300. In the case where the LDEV is set in a storage pool, the identifier of the storage pool is stored as the POOL-ID 351301.

Figure 10:
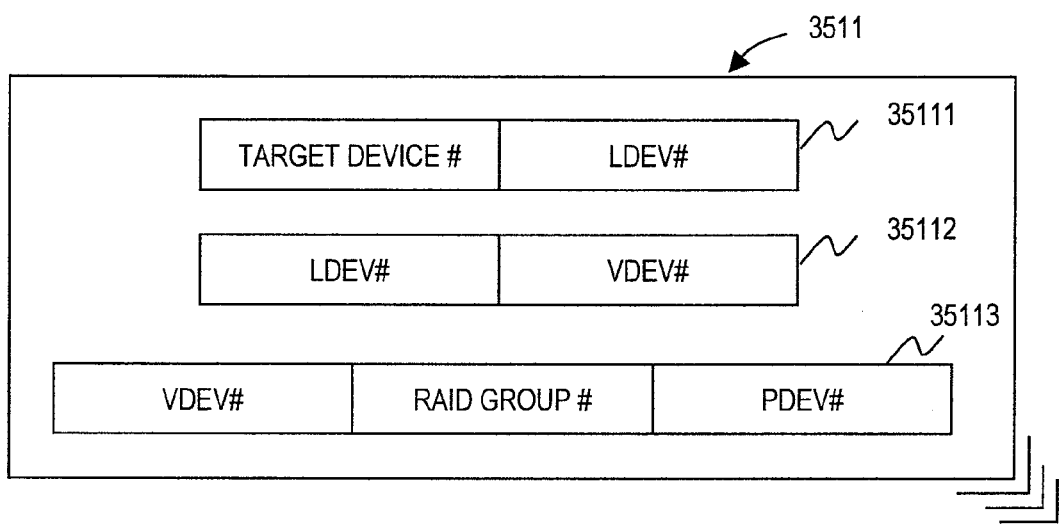
FIG. 10 is an explanatory diagram of an address management table according to the first embodiment of this invention.

FIG. 10 is an explanatory diagram of the address management table.

The address management table 3511 holds mapping information in which addresses of target devices, LDEVs, VDEVs, and physical devices are mapped out.

The address management table 3511 includes the target device-LDEV mapping information 35111, the LDEV-VDEV mapping information 35112 and the VDEV-PDEV mapping information 35113.

The target device-LDEV mapping information 35111 holds the association between a target device address and an LDEV address.

The LDEV-VDEV mapping information 35112 holds LDEV addresses and VDEV addresses.

The VDEV-PDEV mapping information 35113 holds VDEV addresses, the number of a RAID group of a VDEV (or a parity group), and PDEV addresses.

The storage system 30 consults the address management table to know which address of which LDEV a target device address is associated with. Which address of which VDEV an LDEV address is associated with can also be known by consulting the address management table. Furthermore, consultation with the address management table informs to which RAID group a VDEV address belongs as well as which address of which PDEV the VDEV address is associated with.

Figure 11A:
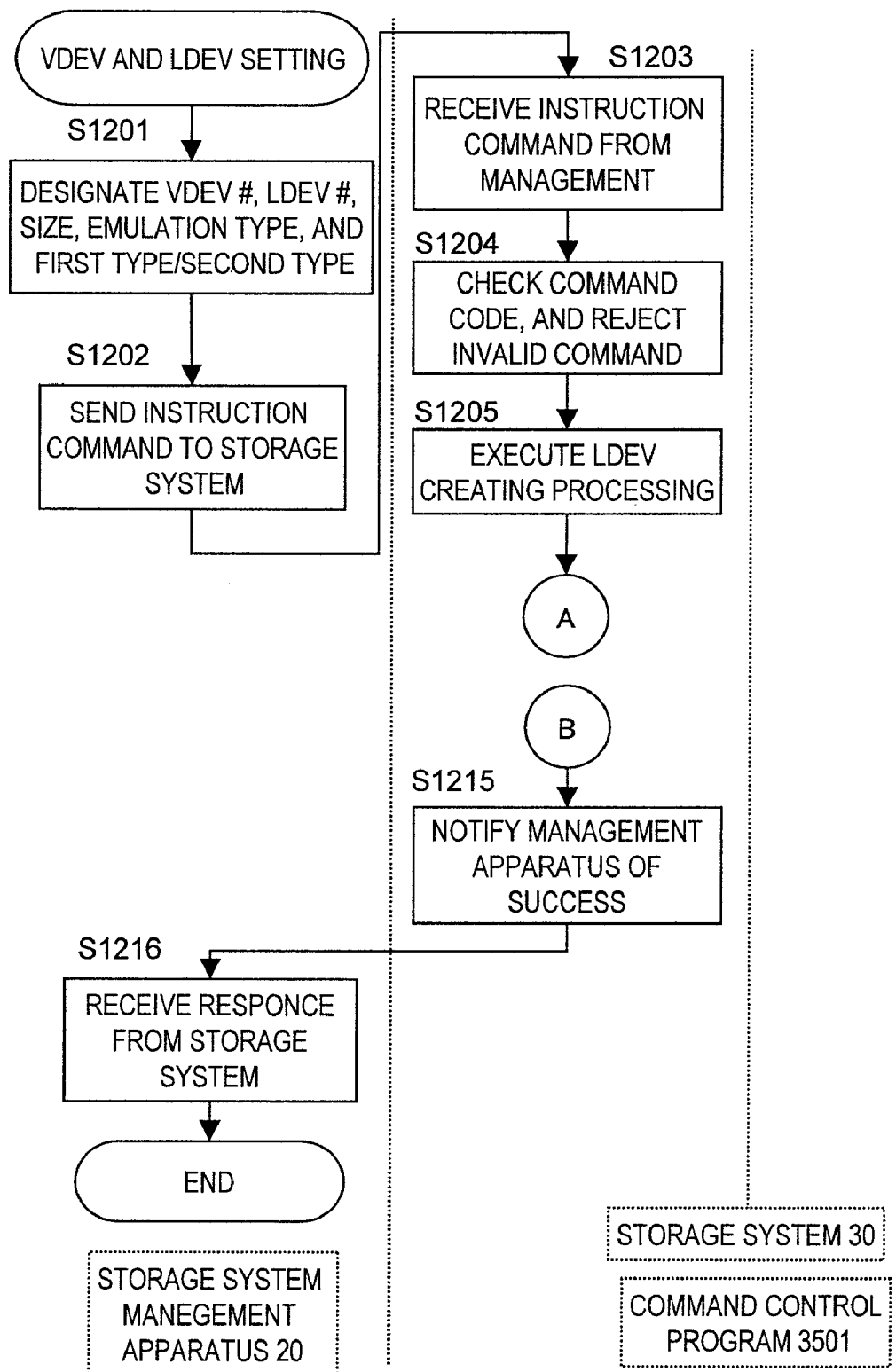
FIG. 11A is a flow chart for a modification example of setting a VDEV and an LDEV according to the first embodiment of this invention.
Figure 11B:
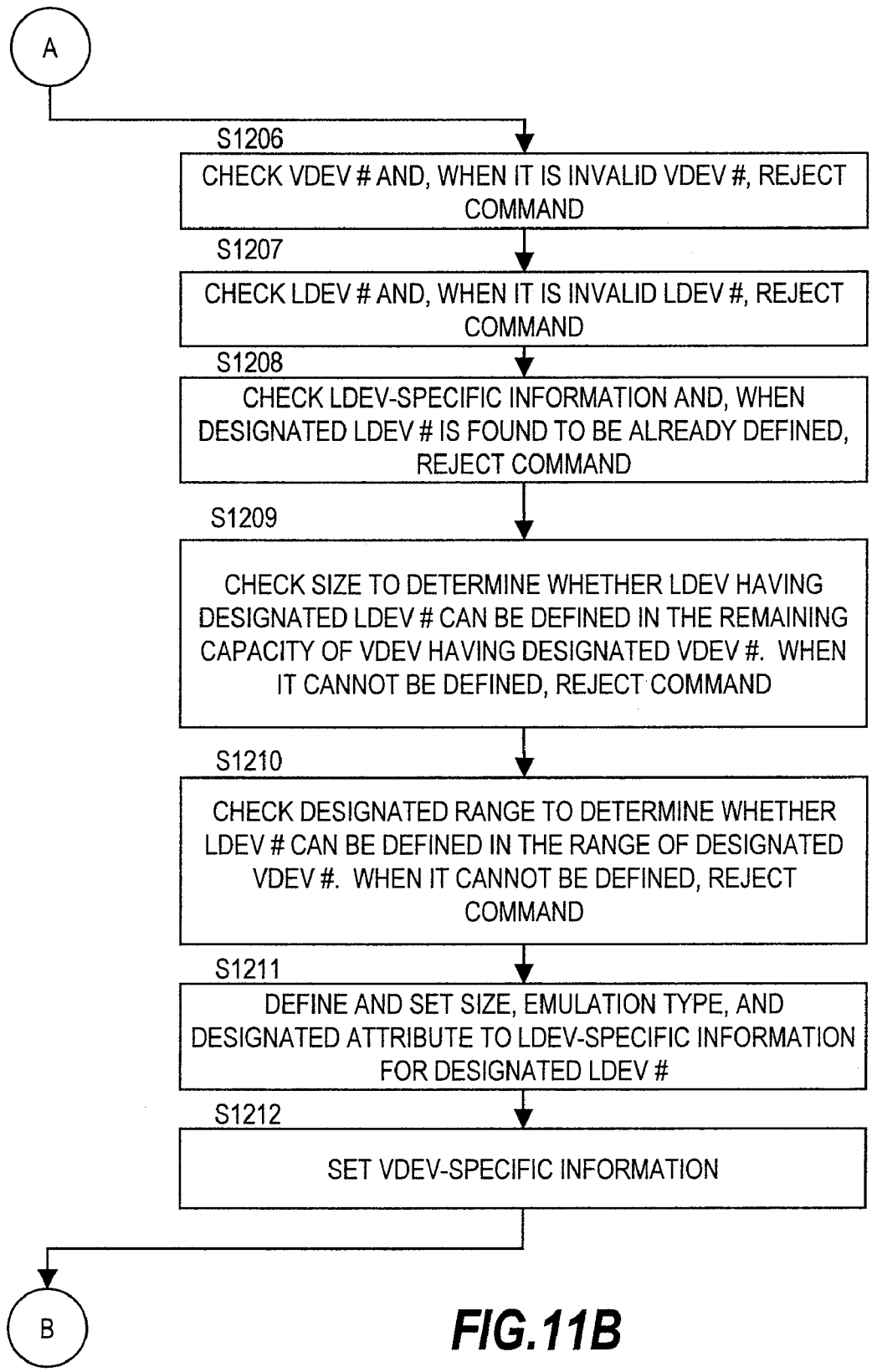
FIG. 11B is a flow chart for the modification example of setting a VDEV and an LDEV according to the first embodiment of this invention.

FIGS. 11A and 11B are flow charts for another example of setting a VDEV and an LDEV.

The flow charts show processing of setting a VDEV and an LDEV whose device attribute is "virtual volume" by executing the above-described processing of FIGS. 6 and 7 at once.

First, the administrator operates the input unit 210 to set a number assigned to a VDEV that is to be set by this processing, a number assigned to an LDEV that is to be set by this processing, an emulation type to be set to the VDEV, the size of the LDEV, a head slot number, an end slot number, and a type (the first type or the second type) (a step S1201).

The storage configuration management program 2404 creates an instruction command containing the information set by the administrator to set the LDEV. The created instruction command is sent to the storage system 30 via the network adapter 250 (a step S1202).

In the storage system 30, an instruction command sent from the storage system management apparatus 20 is received by the command control program 3501 via the network adapter 320 (a step S1203). The command control program 3501 checks what is instructed by the received instruction command. In the case where the instruction is not valid, the instruction command is rejected (a step S1204).

When a received instruction command is about setting a VDEV, the command control program 3501 forwards the received instruction command to the configuration control program 3503. The configuration control program 3503 receives the instruction command and executes VDEV setting processing (a step S1205).

Referring now to FIG. 11B, the configuration control program 3503 checks the VDEV number designated in the instruction command. In the case where the VDEV number designated in the instruction command is invalid, the instruction command is rejected (a step S1206).

The configuration control program 3503 then checks the LDEV number designated in the instruction command. In the case where the LDEV number designated in the instruction command is invalid, the instruction command is rejected (a step S1207).

Next, the configuration control program 3503 consults the LDEV management information 3512 to check whether LDEV-specific information has been defined for the LDEV number designated in the instruction command. In the case where the LDEV-specific information has already been defined, the instruction command is rejected (a step S1208).

The configuration control program 3503 next consults the VDEV management information 3514 to obtain the remaining size from the VDEV-specific information for the VDEV number designated in the instruction command, and to check whether the remaining size is enough to define the LDEV as instructed by the instruction command. In the case where the remaining capacity is not enough, the instruction command is rejected (a step S1209).

The configuration control program 3503 next checks the head slot number and the end slot number that are designated in the instruction command in order to determine whether the LDEV can be defined within the address range of the VDEV to be set as instructed by the instruction command. In the case where the LDEV cannot be defined in the range, the instruction command is rejected (a step S1210).

The configuration control program 3503 next sets LDEV-specific information for the LDEV number designated in the instruction command (a step S1211). Specifically, the configuration control program 3503 newly creates LDEV-specific information for the LDEV number designated in the instruction command. The LDEV number, a head slot number, an end slot number, and a device attribute are defined and set to the LDEV-specific information. In the case where the LDEV to be set through this processing is a second type LDEV, "second type LDEV" is set as a device attribute.

After the LDEV-specific information is set, VDEV-specific information is set for the VDEV number designated in the instruction command (a step S1212). Specifically, the count of set LDEVs is added up, and the LDEV number designated in the instruction command, the remaining size, a head LDEV slot, and an end LDEV slot are set.

In this way, the LDEV to be set as instructed by the instruction command is set in the VDEV.

Returning to FIG. 11A, the command control program 3501 notifies, upon completion of the LDEV setting processing, the storage system management apparatus 20 of the success of the command (a step S1215).

Notified of the success of the command from the storage system 30 (a step S1216), the storage configuration management program 2404 of the storage system management apparatus 20 ends the processing.

A VDEV and an LDEV whose device attribute is "virtual volume" are set through this processing.

The description given next is how a storage pool is set.

As described above, the storage system 30 sets an LDEV in a storage pool and sets the LDEV as the storage area of a virtual volume.

Figure 12A:
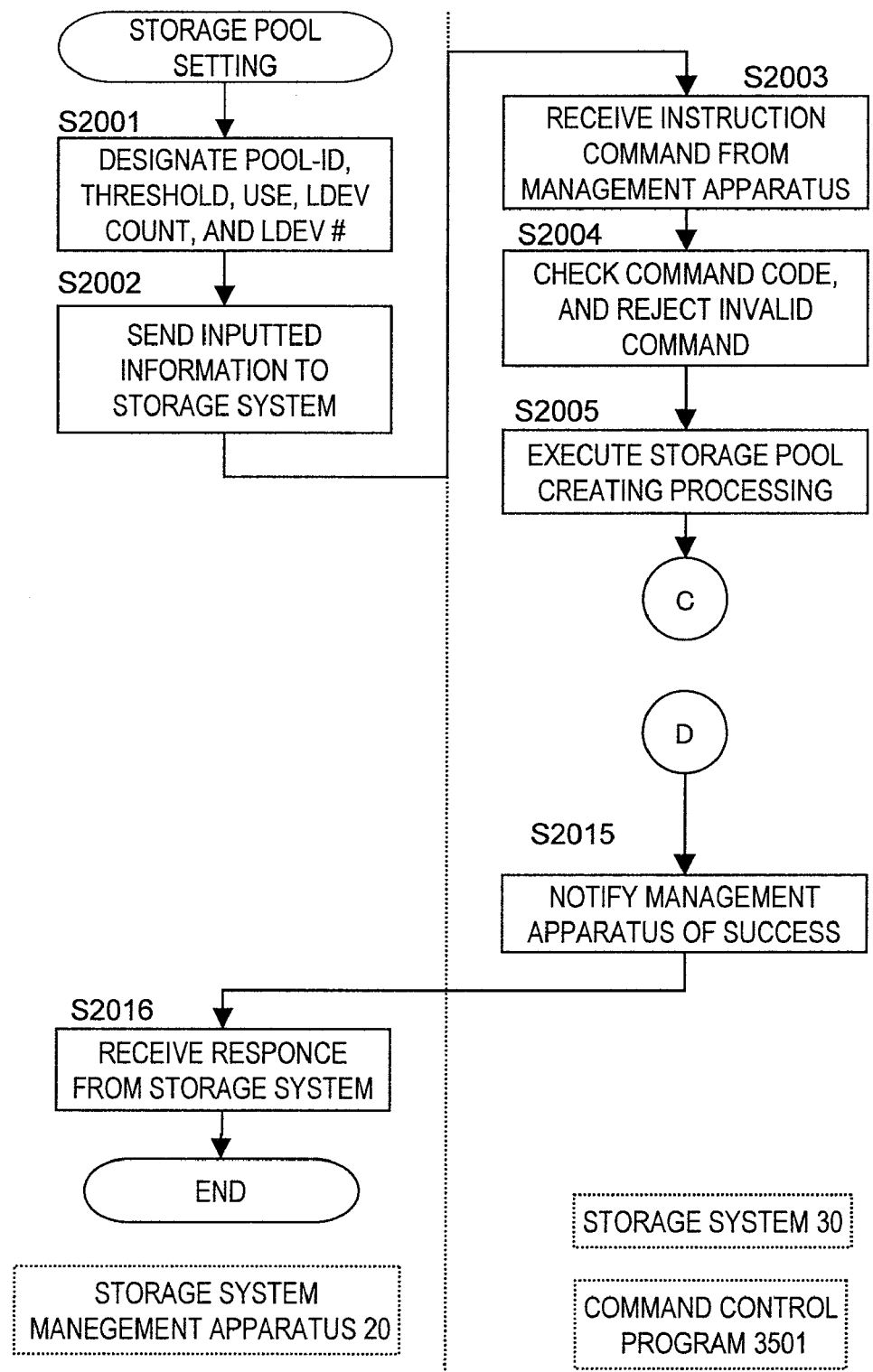
FIG. 12A is a flow chart for setting a storage pool according to the first embodiment of this invention.
Figure 12B:
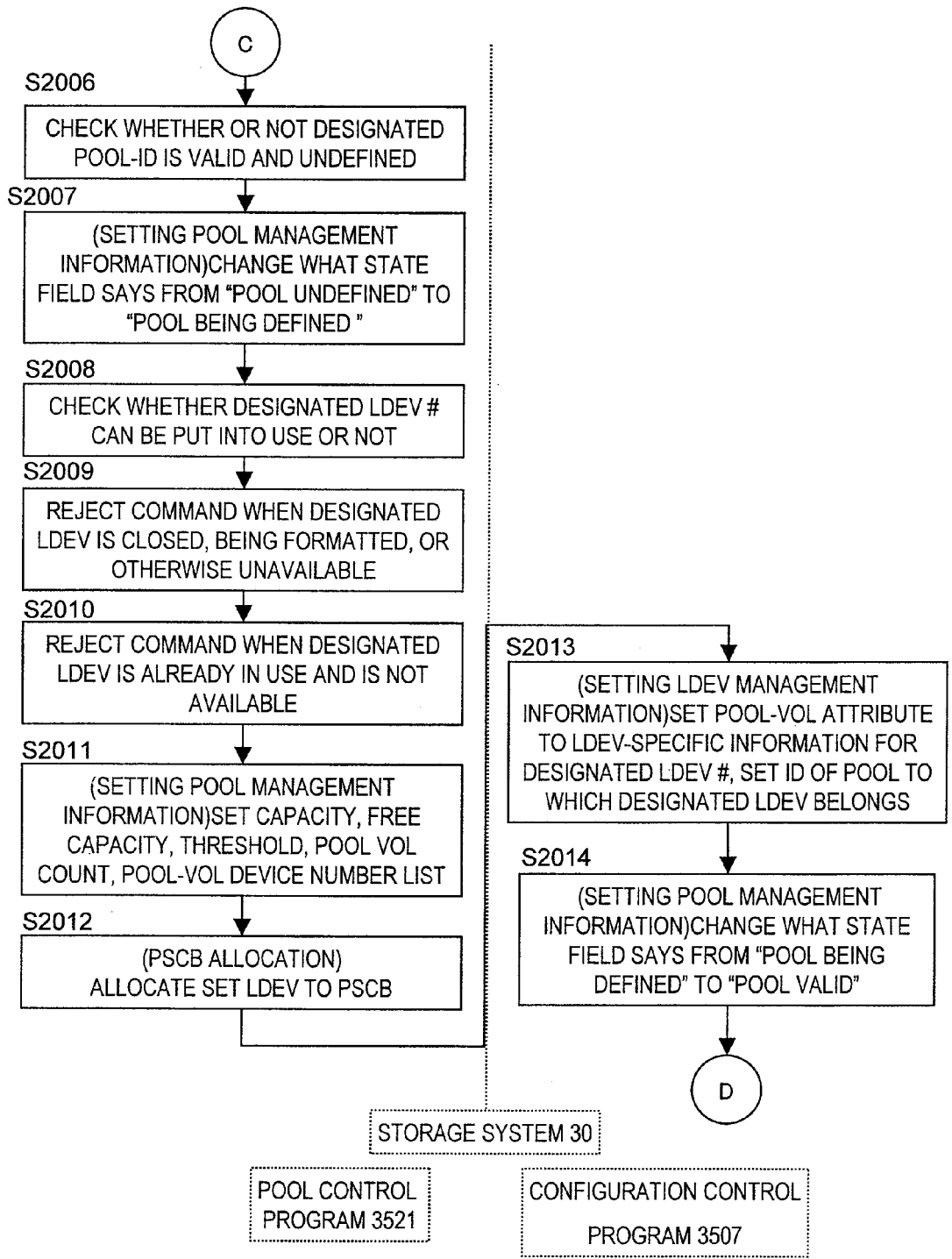
FIG. 12B is a flow chart for setting a storage pool according to the first embodiment of this invention.

FIGS. 12A and 12B are flow charts for setting a storage pool.

Processing of setting a storage pool is executed by the storage configuration management program 2404 of the storage system management apparatus 20.

First, the administrator inputs information on a first type LDEV to be set in a storage pool. The administrator operates the input unit 210 to set a POOL-ID, which is the identifier of a storage pool, a threshold, an LDEV count, and an LDEV number (a step S2001). An LDEV set in a storage pool has to be a first type LDEV, which is a physical device.

The storage configuration management program 2404 creates an instruction command containing the information set by the administrator to set a storage pool. The created instruction command is sent to the storage system 30 via the network adapter 250 (a step S2002).

In the storage system 30, an instruction command sent from the storage system management apparatus 20 is received by the command control program 3501 via the network adapter 320 (a step S2003).

The command control program 3501 checks what is instructed by the received instruction command. In the case where the instruction is not valid, the instruction command is rejected (a step S2004).

When a received instruction command is about setting a storage pool, the command control program 3501 forwards the received instruction command to the pool control program 3507. The pool control program 3507 receives the instruction command and executes storage pool setting processing (a step S2005).

Referring now to FIG. 12B, the pool control program 3507 first checks whether the POOL-ID designated in the instruction command is valid or not, and whether or not the POOL-ID has yet been defined (a step S2006).

Next, the pool control program 3507 obtains, from the POOL management information 3521, POOL-specific information for the POOL-ID designated in the instruction command, and changes the state from "POOL undefined" to "POOL being defined" (a step S2007).

The pool control program 3507 next checks whether the LDEV number designated in the instruction command can be put into use or not (a step S2008). Specifically, in the case where the LDEV that is identified by the LDEV number designated in the instruction command is blocked or being formatted, the LDEV cannot be put into use and accordingly the instruction command is rejected (a step S2009). The LDEV is not available and the instruction command is rejected also when the LDEV that is identified by the LDEV number designated in the instruction command is already in use (for example, when a path has already been defined for the LDEV, when the copy function or the like is using the LDEV, or when the LDEV is reserved to be copied a data next) (a step S2010).

The pool control program 3507 next sets, to the POOL-specific information, the capacity, the free capacity, a threshold, a POOL-VOL count, and a POOL-VOL device list (a step S2011). Then the PSCB 3524 is allocated to the first type LDEV that is set in the storage pool (a step S2012). The PSCB 3524 will be described with reference to FIG. 14.

A first type LDEV is set in a storage pool through this processing of the pool control program 3507.

After the storage pool is set, the configuration control program 3503 sets the LDEV management information 3512 (a step S2013). Specifically, the configuration control program 3503 consults the LDEV management information 3512 to obtain LDEV-specific information of the LDEV that is set in the storage pool. An identifier indicative of a storage pool (POOL-VOL attribute) is set as the device attribute 35128 of the obtained LDEV-specific information. The POOL-ID designated in the instruction command is set as the POOL-ID 351301 of the obtained LDEV-specific information.

Next, the configuration control program 3503 sets the state of the POOL-ID as "POOL valid" in the POOL management information 3521 (a step S2014). Then the storage system management apparatus 20 is notified of the success of the command (a step S2015).

Received response from the command by the storage system 30 (a step S2016), the storage configuration management program 2404 of the storage system management apparatus 20 ends the processing.

A first type LDEV is set in a storage pool through this processing.

Figure 13:
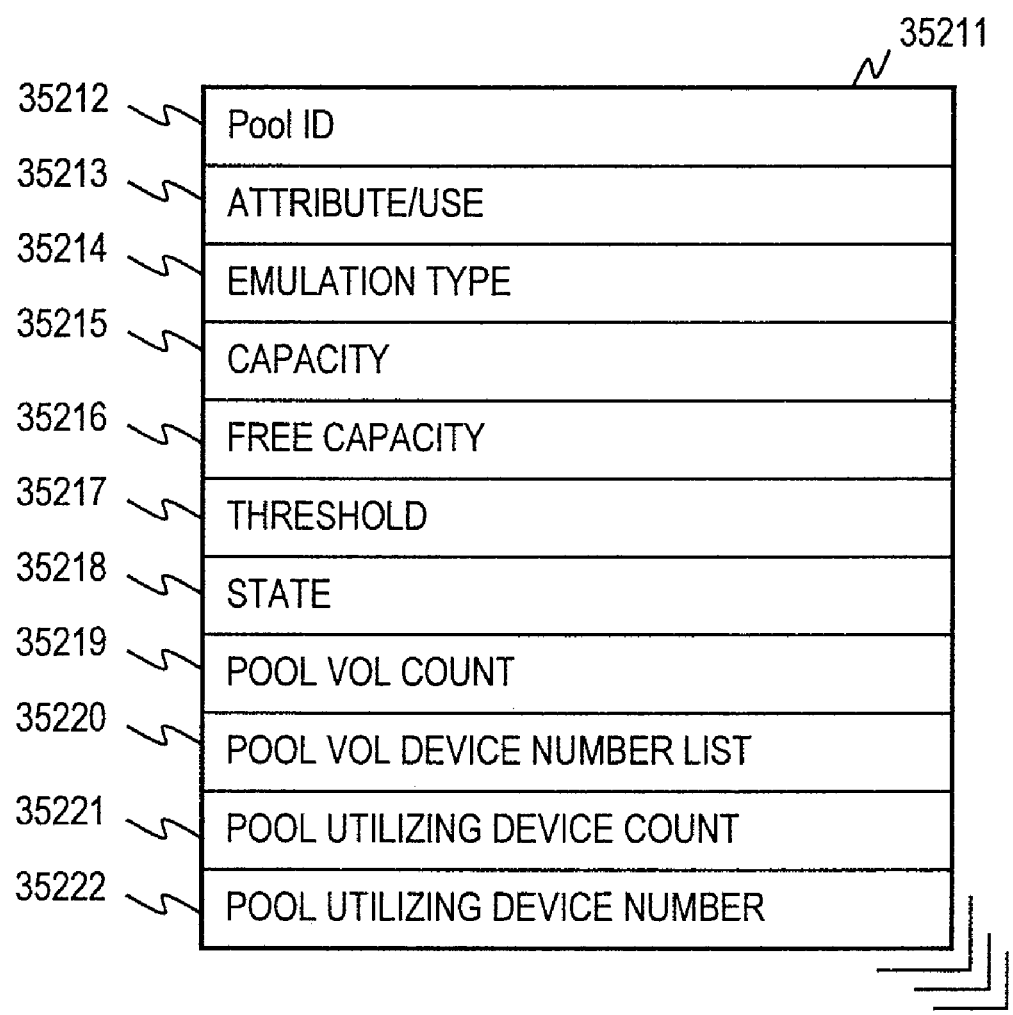
FIG. 13 is an explanatory diagram of POOL management information according to the first embodiment of this invention.

FIG. 13 is an explanatory diagram of POOL management information.

The POOL management information 3521 includes POOL-specific information 35211.

The POOL-specific information 35211 contains a POOL-ID 35212, an attribute/use 35213, an emulation type 35214, a capacity 35215, a free capacity 35216, a threshold 35217, a state 35218, a POOL-VOL count 35219, a POOL-VOL device number list 35220, a POOL utilizing device count 35221, and a POOL utilizing device number 35222.

A POOL identifier is stored as the POOL-ID 35212. Stored as the attribute/use 35213 is an identifier indicating the attribute and use of the storage pool in question. The attribute of a storage pool refers to the form of linking of the PSCB 3524 (which will be described later with reference to FIGS. 15 and 16). The use of a storage pool refers to in what form the storage pool is run, for example, as a snapshot or as a system area.

Stored as the emulation type 35214 is an identifier indicating the emulation type of the storage pool. The capacity 35215 indicates the total capacity of the storage pool. The free capacity 35216 indicates the size of an unused area in the storage pool.

The threshold 35217 indicates the maximum data storing capacity of the storage pool. The state 35218 indicates the current state of the storage pool, such as "being defined", "being expanded" and "valid". The POOL-VOL count 35219 indicates the total count of LDEVs that are set as the storage pool. The POOL-VOL device number list 35220 is a list of LDEV numbers assigned to the LDEVs that are set as the storage pool. The POOL utilizing device count 35221 indicates the count of second type LDEVs that are associated with the LDEVs of the storage pool. Stored as the POOL utilizing device number 35222 is a list of LDEV numbers assigned to the second type LDEVs that are associated with the LDEVs of the storage pool.

Figure 14:
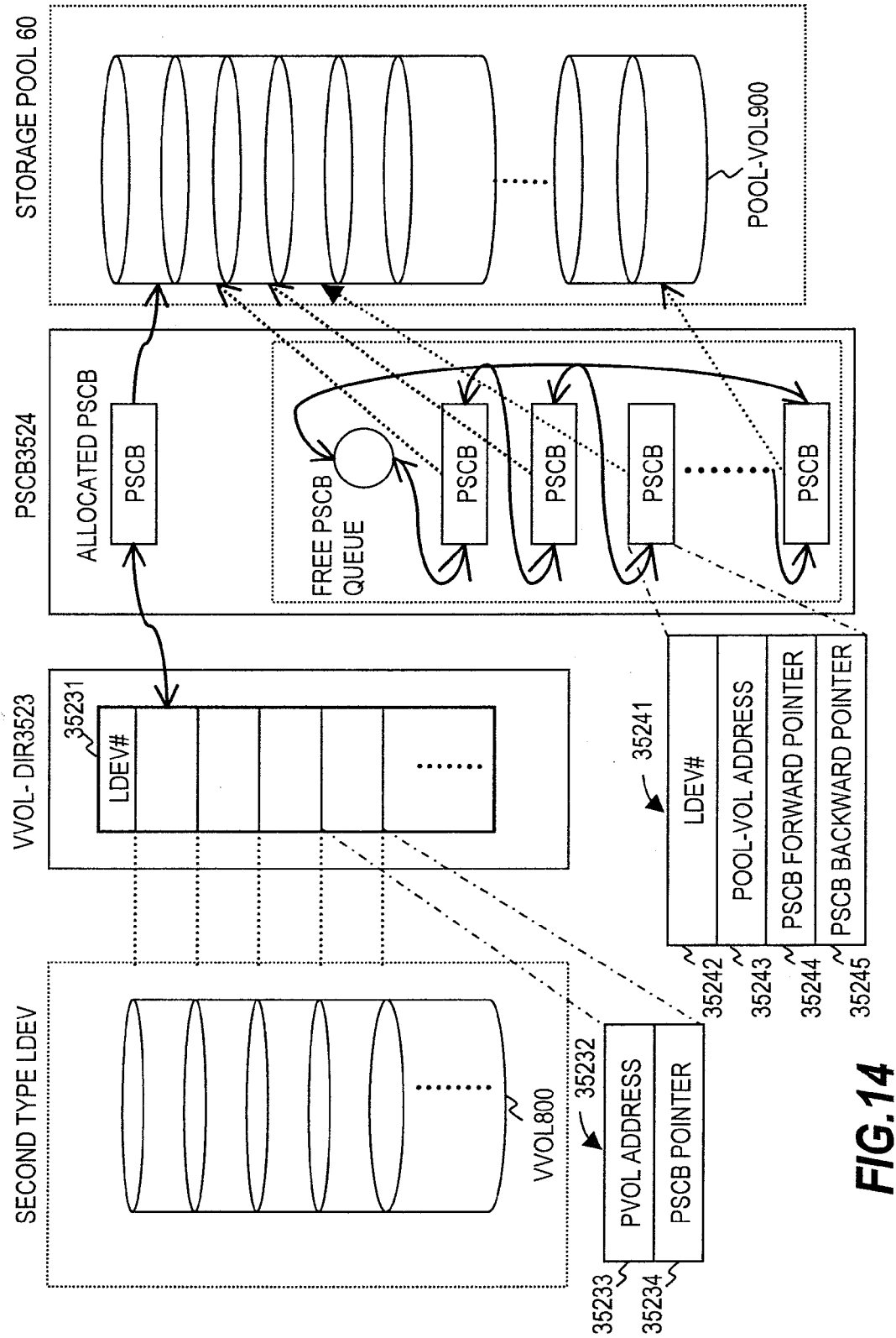
FIG. 14 is an explanatory diagram of VVOL-DIR and PSCB according to the first embodiment of this invention.

FIG. 14 is an explanatory diagram of the VVOL-DIR 3523 and the PSCB 3524.

Stored as the VVOL-DIR 3523 is configuration information of a second type LDEV, which is a storage area of a virtual volume. Stored as the PSCB (POOL Slot Control Block) 3524 is configuration information of a first type LDEV set in a storage pool.

As described, the storage system 30 arranges the PDEVs 34, 34, 34 . . . into a RAID configuration to build a first type VDEV. The first type VDEV is divided into first type LDEVs, which are storage areas. A first type LDEV is set in a storage pool through the processing described above with reference to FIGS. 11A and 11B. A volume that is constituted of a first type LDEV set in a storage pool is referred to as POOL-VOL and denoted by 900.

The storage system 30 also has a second type VDEV, which is set as a virtual volume (VVOL). The second type VDEV is divided into second type LDEVs, which are storage areas.

The storage system 30 allocates a second type LDEV of a VVOL 800 to a first type LDEV of the POOL-VOL 900. In this way, a storage area of a virtual volume accessed by the host computer 10 is set in a first type LDEV constituted of the PDEVs 34, 34, 34 . . . , which are physical devices.

The configuration of a VVOL is stored as the VVOL-DIR 3523. The VVOL-DIR 3523 contains an LDEV number (LDEV #) 35231 and an entry 35232.

Stored as the LDEV number (LDEV #) 35231 is the identifier of a second type LDEV. The entry 35232 holds configuration information of a second type LDEV. The entry 35232 has a second type LDEV address 35233 and a PSCB pointer 35234.

Stored as the second type LDEV address 35233 is the address of a second type LDEV of a VVOL.

In the case where the second type LDEV whose address is indicated by the second type LDEV address 35233 is allocated to a first type LDEV of the POOL-VOL 900, a pointer to the area of this first type LDEV is stored as the PSCB pointer 35234. By default, none of second type LDEVs are set to first type LDEVs, and accordingly "NULL" is stored as the PSCB pointer 35234.

The PSCB (POOL Slot Control Block) 3524 indicates information of a first type LDEV set in a storage pool. The PSCB 3524 is set for each slot of a first type LDEV that is set in a storage pool.

The PSCB 3524 contains an LDEV number (LDEV #) 35241, a POOL-VOL address 35242, a PSCB forward pointer 35243 and a PSCB backward pointer 35244.

Stored as the LDEV number (LDEV #) 35241 is the identifier of a first type LDEV in the POOL-VOL 900. The POOL-VOL address 35242 indicates the address of the first type LDEV in the POOL-VOL 900.

Stored as the PSCB forward pointers 35243 and the PSCB backward pointers 35244 are the identifiers of the front and back slots of the first type LDEV in the POOL-VOL 900, respectively.

A free PSCB queue 35240 indicates the beginning of an unused area of the POOL-VOL 900. The free PSCB queue 35240 contains a pointer to the PSCB 3524 which indicates the next slot.

The storage system 30 consults a pointer contained in the free PSCB queue 35240 to obtain the next PSCB 3524. Then the storage system 30 consults the PSCB backward pointer 35245 of the next PSCB 3524 to obtain the subsequent PSCB 3524. The PSCBs 3524, 3524, 3524 . . . are thus traced down one at a time until the PSCB 3524 that corresponds to the final slot of the unused area is obtained. The PSCB backward pointer 35244 of the final PSCB 3524 is the free PSCB queue 35240. The storage system 30 finds out the location of an unused area of the POOL-VOL 900 in a storage pool from a group linked by pointers of the PSCBs 3524, 3524, 3524 . . . which is obtained by following the free PSCB queue 35240.

The PSCB 3524 for a first type LDEV set in a storage pool is set in the step S2012 of FIG. 12B. Specifically, the PSCB 3524 is set for each slot of a first type LDEV set in a storage pool, and then the free PSCB queue 35240 is set. By default, every part of a storage pool is unused and a group linked by the free PSCB queue 35240 covers all areas of first type LDEVs set in the storage pool.

The storage system 30 makes an area of a storage pool available by allocating as many PSCBs 3524, 3524, 3524 . . . as the number of necessary slots to the VVOL-DIR 3523, which represents configuration information of a second type LDEV. Specifically, the storage system 30 consults the free PSCB queue 35240 and obtains the PSCBs 3524, 3524, 3524 . . . for necessary areas to be allocated to a second type LDEV. Each obtained PSCB 3524 is allocated to an entry of the VVOL-DIR 3523. In other words, in each entry of the VVOL-DIR 3523, a pointer indicating the corresponding PSCB 3524 is stored as the PSCB pointer 35234. Once allocated, the PSCB 3524 is removed from the link of the free PSCB queue 35240.

In this way, each slot of a second type LDEV is allocated to the PSCB 3524 indicated by the PSCB pointer 35234 in each entry of the VVOL-DIR 3523. Since each PSCB 3524 corresponds to a slot of a first type LDEV, this ultimately allocates the second type LDEV to the first type LDEV and makes a virtual volume accessed by the host computer 10 usable as a physical device.

Figure 15:
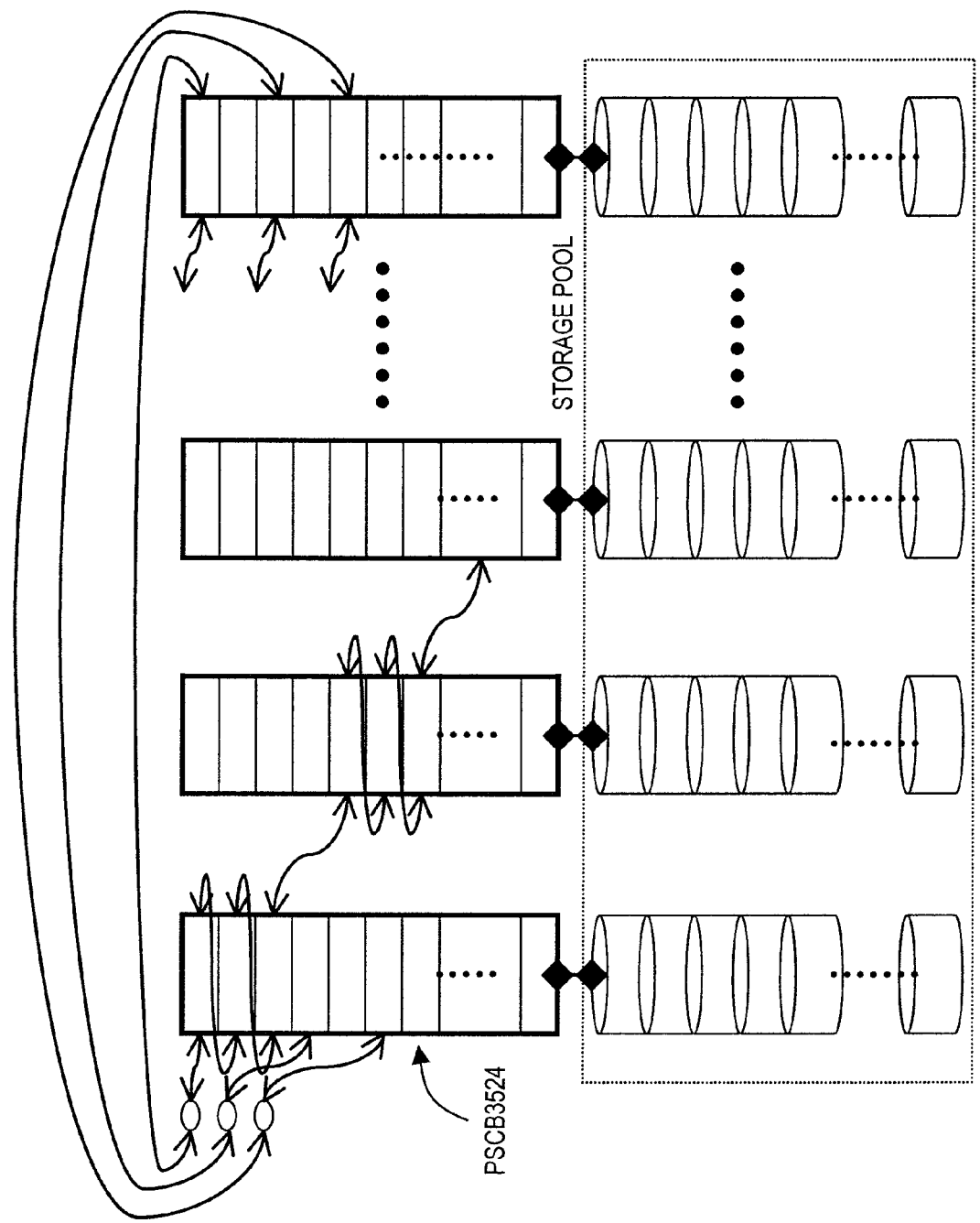
FIG. 15 is an explanatory diagram of an example of how PSCBs are linked according to the first embodiment of this invention.

FIG. 15 is an explanatory diagram of an example of how the PSCBs 3524, 3524, 3524 . . . are linked.

There are several ways to link the PSCBs 3524, 3524, 3524 . . . of a first type LDEV in the POOL-VOL 900.

In the example of FIG. 15, slots of first LDEVs in the same POOL-VOL are linked sequentially. This method is called sequential linking. Set in this way, a POOL-VOL obtains a continuous area stretching over first type LDEVs. Accordingly, in the case where the host computer 10 stores large-sized data that spreads over plural LDEVs in the storage system 30, the data can be accessed by accessing only one POOL-VOL and it improves the access speed.

Figure 16:
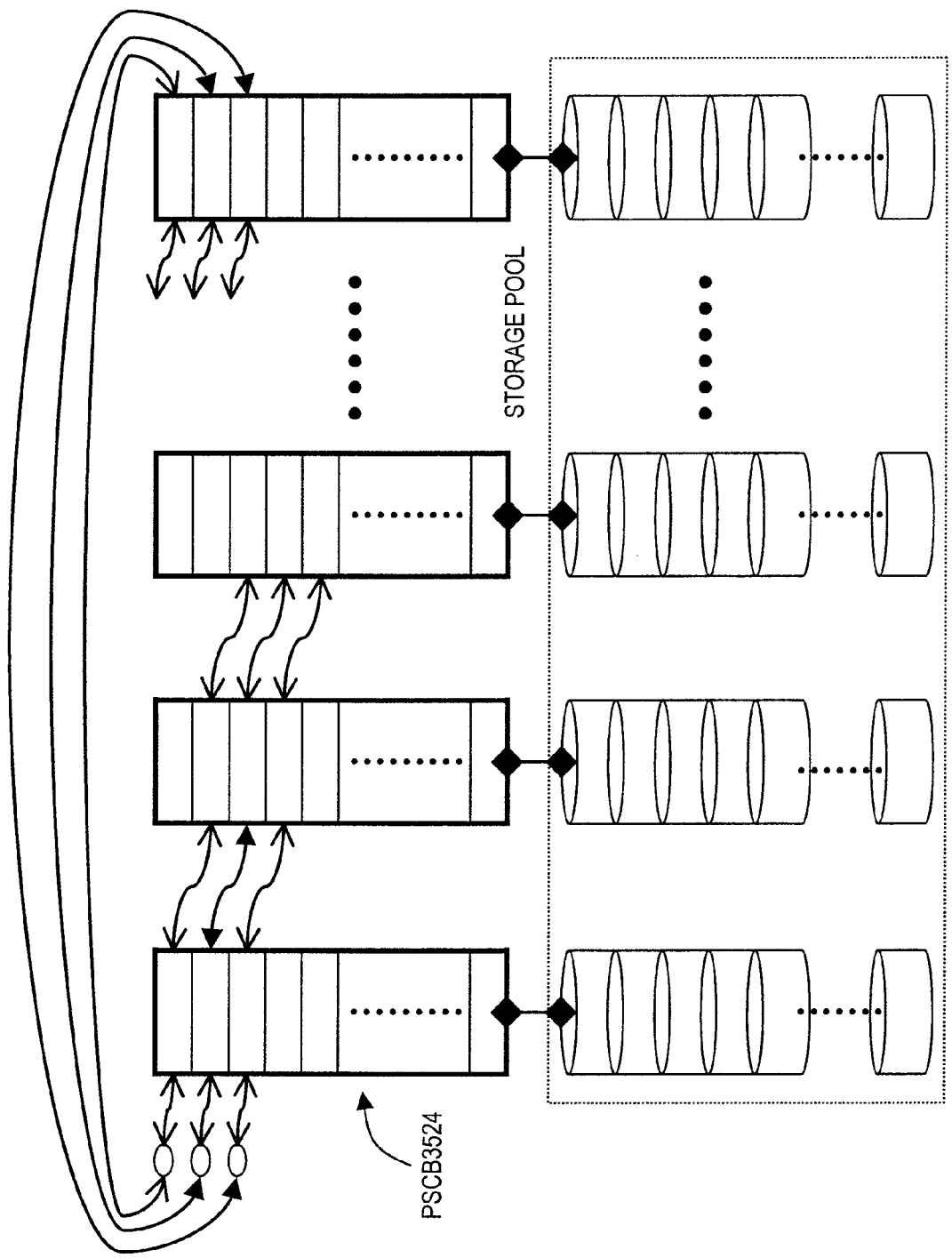
FIG. 16 is an explanatory diagram of another example of how PSCBs are linked according to the first embodiment of this invention.

FIG. 16 is an explanatory diagram of another example of how the PSCBs 3524, 3524, 3524 . . . are linked.

In the example of FIG. 16, slots of first type LDEVs scattered over different POOL-VOLs 900, 900, 900 . . . are linked. This method is called random linking. With random linking, in the case where the host computer 10 stores many, relatively small pieces of data each of which does not exceed the total capacity of an LDEV in the storage system 30, different first type LDEVs are accessed in parallel and it improves the access speed.

Thus the storage system 30 can employ a method of linking PSCB 3524 that is suited to the type of data to be accessed.

Figure 17:
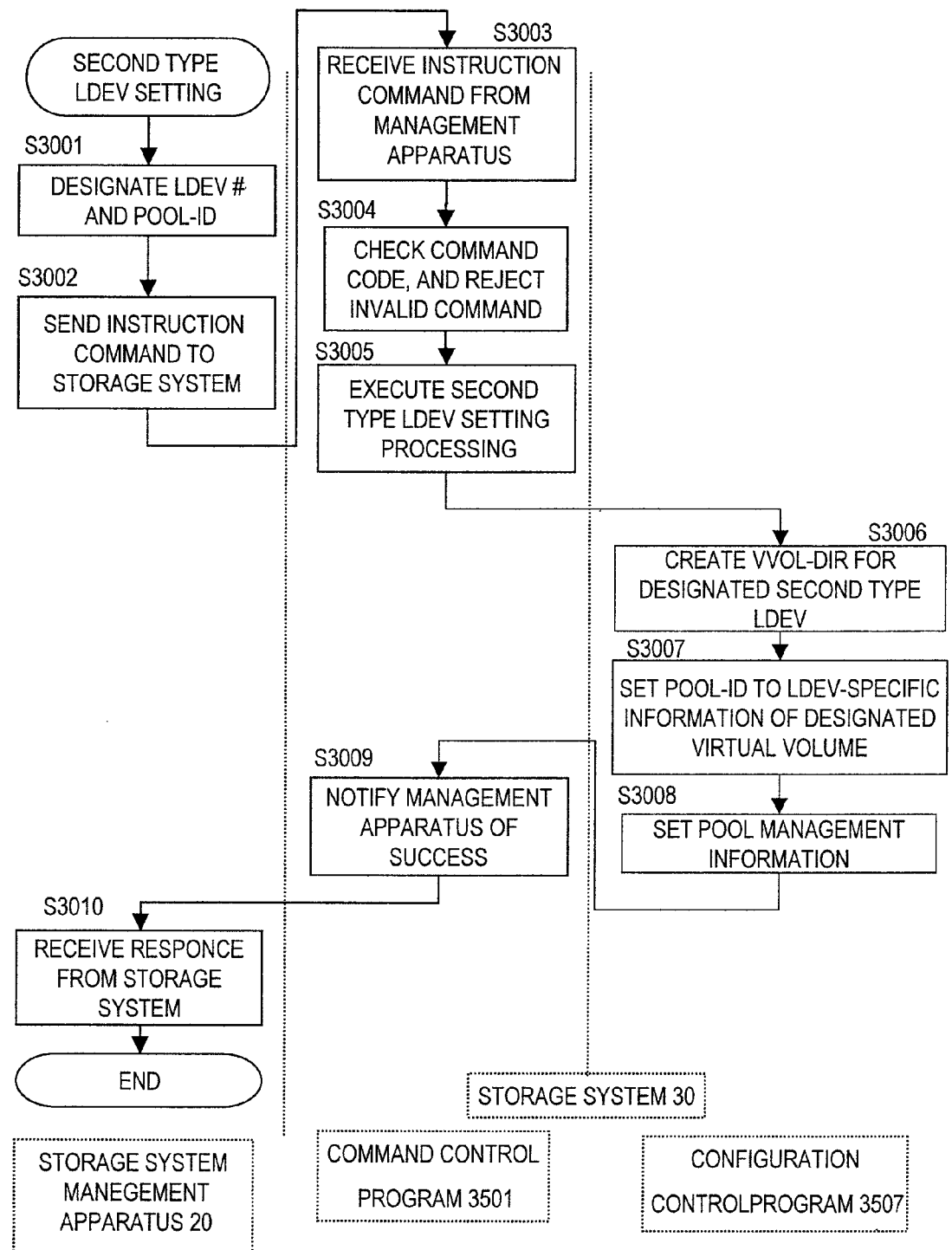
FIG. 17 is a flow chart for setting a virtual volume according to the first embodiment of this invention.

FIG. 17 is a flow chart for setting a second type LDEV. This processing is to associate a second type LDEV, which is set in a virtual volume, with a storage pool.

This processing is executed by the storage configuration management program 2404 of the storage system management apparatus 20. A second type LDEV associated with a storage pool through this processing is allocated to a first type LDEV that is set in a storage pool through the processing of FIGS. 11A and 11B, to thereby enable the host computer 10 to use a virtual volume as a storage area.

First, the administrator operates the input unit 210 to set a POOL-ID, which is the identifier of a POOL-VOL of a storage pool, and an LDEV number of a second type LDEV that is to be associated with the storage pool (a step S3001).

The storage configuration management program 2404 creates an instruction command containing the information set by the administrator to associate a storage pool. The created instruction command is sent to the storage system 30 via the network adapter 250 (a step S3002).

In the storage system 30, an instruction command sent from the storage system management apparatus 20 is received by the command control program 3501 via the network adapter 320 (a step S3003). The command control program 3501 checks what is instructed by the received instruction command. In the case where the instruction is not valid, the instruction command is rejected (a step S3004).

When a received instruction command is about associating a storage pool, the command control program 3501 forwards the received instruction command to the pool control program 3507. The pool control program 3507 receives the instruction command and executes second type LDEV setting processing (a step S3005).

The pool control program 3507 first creates the VVOL-DIR 3523 of the second type LDEV that has the LDEV number designated in the instruction command (a step S3006). Specifically, the LDEV number is stored as the LDEV # 35231 of the VVOL-DIR 3523. Then the entry 35232 of the VVOL-DIR 3523 is created for each slot of the second type LDEV having the LDEV number.

Next, the pool control program 3507 consults the LDEV management information 3512 to obtain LDEV-specific information of the second type LDEV whose LDEV number is designated in the instruction command. The POOL-ID designated in the instruction command is set as the POOL-ID 351301 of the obtained LDEV-specific information (a step S3007).

The pool control program 3507 next consults the POOL management information 3521 to obtain POOL-specific information for the POOL-ID designated in the instruction command (a step S3008). Specifically, information on second type LDEVs contained in a virtual volume that is indicated by the instruction command is set as the POOL utilizing device count 35221 and POOL utilizing device number 35222 of the POOL-specific information.

After the storage pool is associated, the configuration control program 3503 notifies the storage system management apparatus 20 of the success of the command (a step S3009). Received response from the command by the storage system 30 (a step S3010), the storage configuration management program 2404 of the storage system management apparatus 20 ends the processing.

A second type LDEV, which constitutes a virtual volume, is set in a storage pool through this processing.

Figure 18:
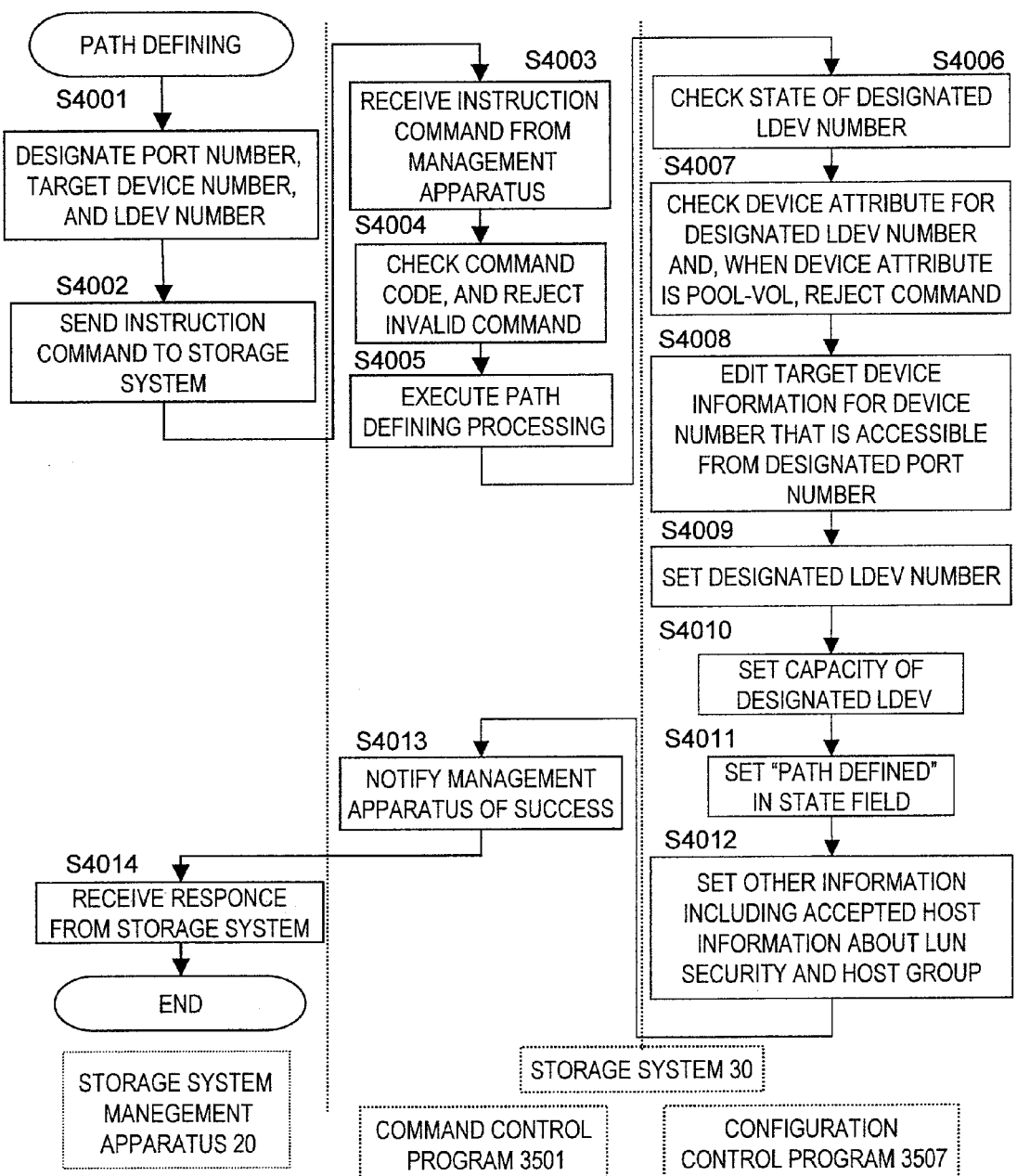
FIG. 18 is a flow chart for defining a path according to the first embodiment of this invention.

FIG. 18 is a flow chart for defining a path.

This processing is to set an LDEV (first type or second type) as a target device of the host computer 10. In the case where a second type LDEV is set as a target device, the target device is a virtual volume.

This processing is executed by the storage configuration management program 2404 of the storage system management apparatus 20.

First, the administrator operates the input unit 210 to set information of a target device. Specifically, the administrator sets the port number of the host adapter 310 connected to the host computer 10, which uses the target device, a target device number, and one or more LDEV numbers (a step S4001).

The storage configuration management program 2404 creates an instruction command containing the information set by the administrator to define a path. The created instruction command is sent to the storage system 30 via the network adapter 250 (a step S4002).

In the storage system 30, an instruction command sent from the storage system management apparatus 20 is received by the command control program 3501 via the network adapter 320 (a step S4003). The command control program 3501 checks what is instructed by the received instruction command. In the case where the instruction is not valid, the instruction command is rejected (a step S4004).

When a received instruction command is about defining a path, the command control program 3501 forwards the received instruction command to the path control program 3502. The path control program 3502 receives the instruction command and executes path defining processing (a step S4005).

The path control program 3502 first checks the state of the LDEV that has the LDEV number designated in the instruction command (a step S4006). In the case where the LDEV that has the LDEV number designated in the instruction command is blocked or being formatted, this LDEV cannot be put into use and therefore the instruction command is rejected.

Next, the path control program 3502 checks the device attribute of the LDEV that has the LDEV number designated in the instruction command (a step S4007). When the device attribute is "POOL-VOL", this LDEV is set in a storage pool and cannot be accessed from the host computer 10. Accordingly, the instruction command is rejected.

In the case where the instruction command is to be accepted, the path control program 3502 edits a target device table in the target device information 3513 for a device number that is assemble from the port number designated in the instruction command (a step S4008).

Specifically, the LDEV number designated in the instruction command is stored in the target device table (a step S4009). The capacity of the LDEV that is identified by the LDEV number designated in the instruction command is also stored in the target device table (a step S4010). Then the state of the target device table is changed to "path defined" (a step S4011), and accepted host information is set (a step S4012).

A path between the host computer 10 and a target device is defined through the processing of the path control program 3502.

After the path is defined, the storage system management apparatus 20 is notified of the success of the command (a step S4013).

Received response from the command by the storage system 30 (a step S4014), the storage configuration management program 2404 of the storage system management apparatus 20 ends the processing.

A virtual volume is set as a target device through this processing.

Figure 19:
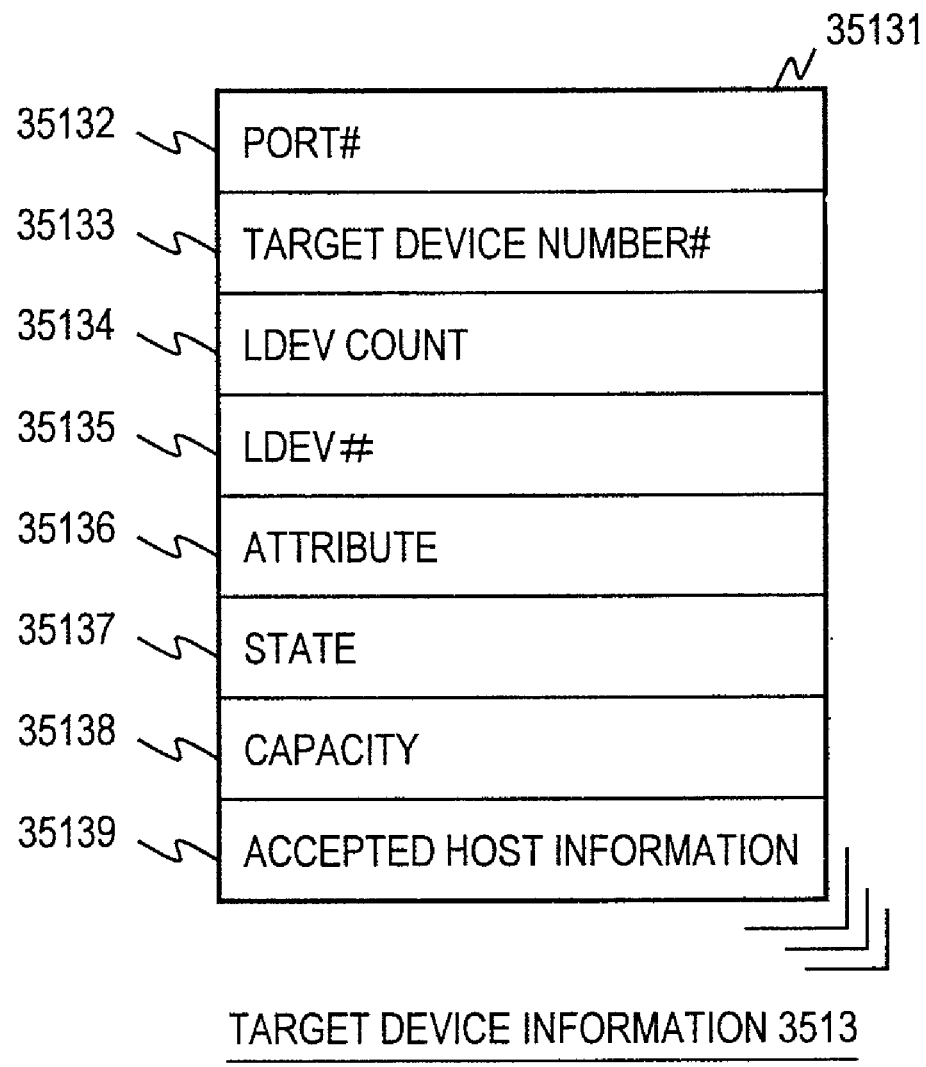
FIG. 19 is an explanatory diagram of target device information according to the first embodiment of this invention.

FIG. 19 is an explanatory diagram of the target device information 3513.

The target device information 3513 has a target device table 35131, which is set for each port number (port #).

The target device table 35131 contains a port number 35132, a target device number 35133, an LDEV count 35134, an LDEV number 35135, an attribute 35136, a state 35137, a capacity 35138 and an accepted host information 35139.

The port number 35132 indicates the port number of the host adapter 310 connected to the host computer 10. Stored as the target device number 35133 is the identifier of a target device to be accessed by the host computer 10. The LDEV count 35134 indicates the total count of LDEVs set as target devices. Stored as the LDEV number 35135 is a list of LDEV numbers that are assigned to LDEVs set as target devices.

Stored as the attribute 35136 is an identifier indicating an attribute of the target device. In the case where an LDEV set as the target device is a first type LDEV, an identifier showing that it is a first type LDEV and not a second type LDEV is stored as the attribute 35136. In the case where the LDEV is a second type LDEV, an identifier showing that it is a second type LDEV and not a first type LDEV is stored as the attribute 35136. In the case where the target device is the command device, an identifier showing that it is the command device is stored as the attribute 35136.

The state 35137 indicates the state of the target device, and an identifier representing the state of a VDEV that is related to the target device is stored as the state 35137. A VDEV can be in a normal state, a blocked state, a failure-induced blocked state, and the like. The capacity 35138 indicates the total capacity of the volume of the target device. Stored as the accepted host information 35139 is the identifier of the host computer 10 that is allowed to access the target device.

The description given next is about changes made to a storage pool.

A first type LDEV is set in a storage pool through the processing described above with reference to FIGS. 12A and 12B. The storage system management apparatus 20 can make changes to the first type LDEV set in the storage pool. Changes the first type LDEV receives are, for example, expansion, scale down, and elimination.

Figure 20:
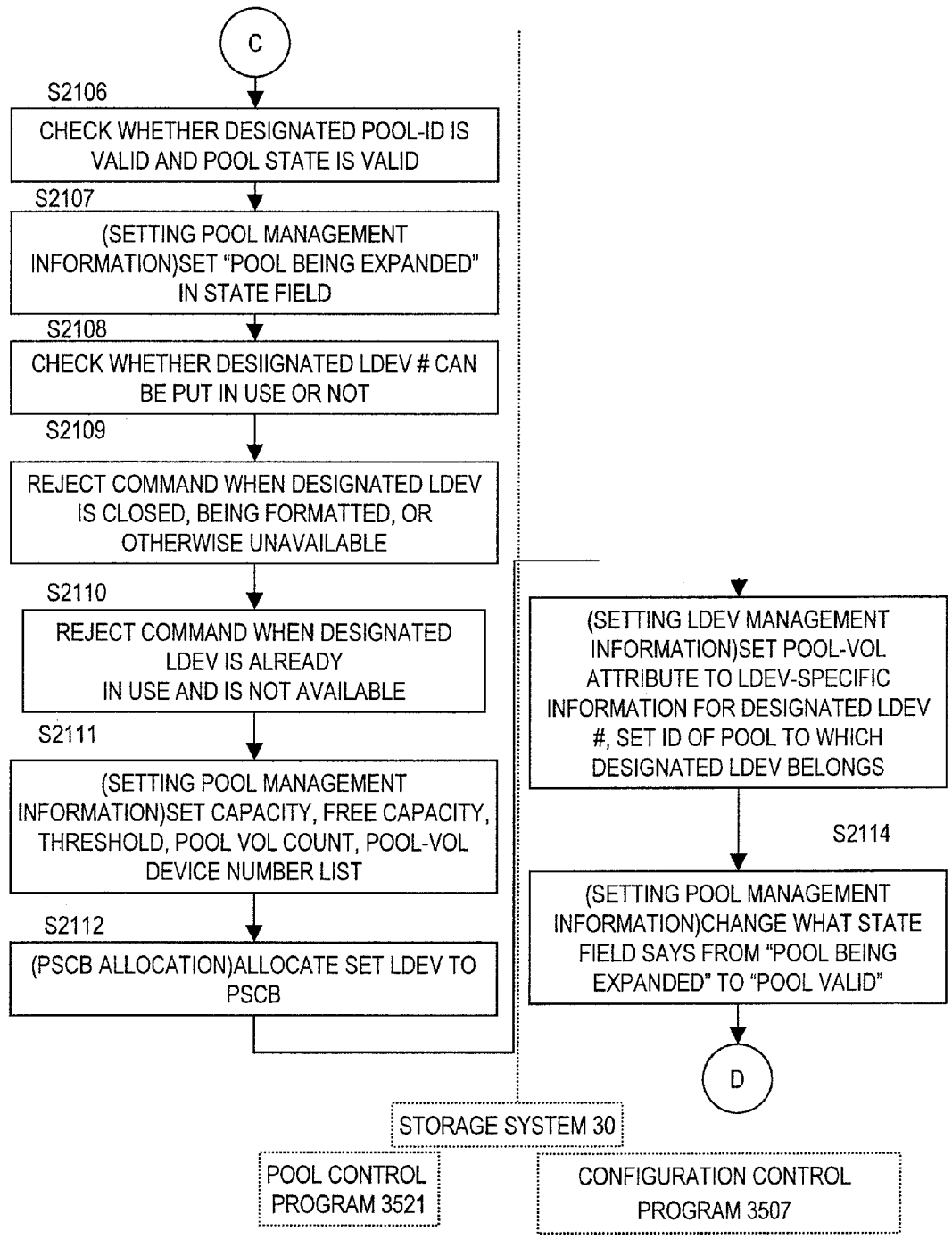
FIG. 20 is a flow chart for expansion of a storage pool according to the first embodiment of this invention.

FIG. 20 is a flow chart for expansion of a storage pool.

Storage pool expansion is processing to expand the capacity of a storage pool by adding first type LDEVs to the storage pool and thus increasing the first type LDEV count of the storage pool.

The storage system management apparatus 20 and the command control program of the storage system 30 execute their respective processing described above with reference to FIG. 12A. In the first step of the processing, the administrator inputs information on a first type LDEV to be set in a storage pool for expansion of the storage pool (the step S2001). The storage configuration management program 2404 sends, to the storage system 30, an instruction command containing the information set by the administrator to set a storage pool (the step S2002). In the storage system 30, the command control program 3501 receives this command (the step S2003). The command control program 3501 rejects the received instruction command in the case where what is instructed by the command is not valid (the step S2004).

When the received instruction command is about expanding a storage pool, the command control program 3501 forwards the received instruction command to the pool control program 3507. The pool control program 3507 receives the instruction command and executes storage pool expanding processing (the step S2005).

Referring now to FIG. 20, the pool control program 3507 first checks whether the POOL-ID designated in the instruction command is valid or not. The pool control program 3507 then obtains POOL-specific information for the POOL-ID designated in the instruction command from the POOL management information 3521 to check whether or not the POOL state field in the obtained POOL-specific information says "valid" (a step S2106). In the case where the POOL-ID is invalid, or the POOL is not in a valid state (for example, when the POOL is invalid, being expanded, or being scaled down), the instruction command is rejected.

Next, the pool control program 3507 sets "POOL being expanded" to the state field of the obtained POOL-specific information (a step S2107).

The pool control program 3507 next checks whether the LDEV number designated in the instruction command can be put into use or not (a step S2108).

Specifically, in the case where the first type LDEV that is identified by the LDEV number designated in the instruction command is blocked or being formatted, the first type LDEV cannot be put into use and accordingly the instruction command is rejected (a step S2109).

The first type LDEV that is identified by the LDEV number designated in the instruction command is not available, so the instruction command is rejected also when the first type LDEV is already in use (for example, when a path has already been defined for the first type LDEV, when the copy function or the like is using the first type LDEV, or when the first type LDEV is reserved for to be copied a data next) (a step S2110).

When the instruction command is accepted, the pool control program 3507 sets, to the POOL-specific information for the POOL-ID designated in the instruction command, the capacity, the free capacity, a threshold, a POOL-VOL count, and a POOL-VOL device list (a step S2111). As the POOL-VOL count, the total count of first type LDEVs after expansion is set to the POOL-specific information. As the POOL-VOL device list, information of first type LDEVs that are added for expansion is added to the POOL-specific information. Next, the PSCB 3524 is allocated to a first type LDEV set in the storage pool (a step S2112).

Through this processing of the pool control program 3507, a first type LDEV designated in an instruction command is added to a storage pool and the storage pool is thus expanded.

After the storage pool is expanded, the configuration control program 3503 sets the LDEV management information 3512 (a step S2113). LDEV-specific information of a first type LDEV that is set in the storage pool is obtained from the LDEV management information 3512. An identifier indicative of a storage pool (POOL-VOL attribute) is set as the device attribute 35128 of the obtained LDEV-specific information. The POOL-ID designated in the instruction command is set as the POOL-ID 351301 of the obtained LDEV-specific information.

Next, the configuration control program 3503 changes the state of the POOL-ID from "POOL being expanded" to "POOL valid" in the POOL management information 3521 (a step S2114).

Returning to FIG. 12A, upon completion of the above processing, the command control program 3501 notifies the storage system management apparatus 20 of the success of the command (the step S2015).

Received response from the command by the storage system 30 (the step S2016), the storage configuration management program 2404 of the storage system management apparatus 20 ends the processing.

A storage pool is expanded through this processing.

Figure 21:
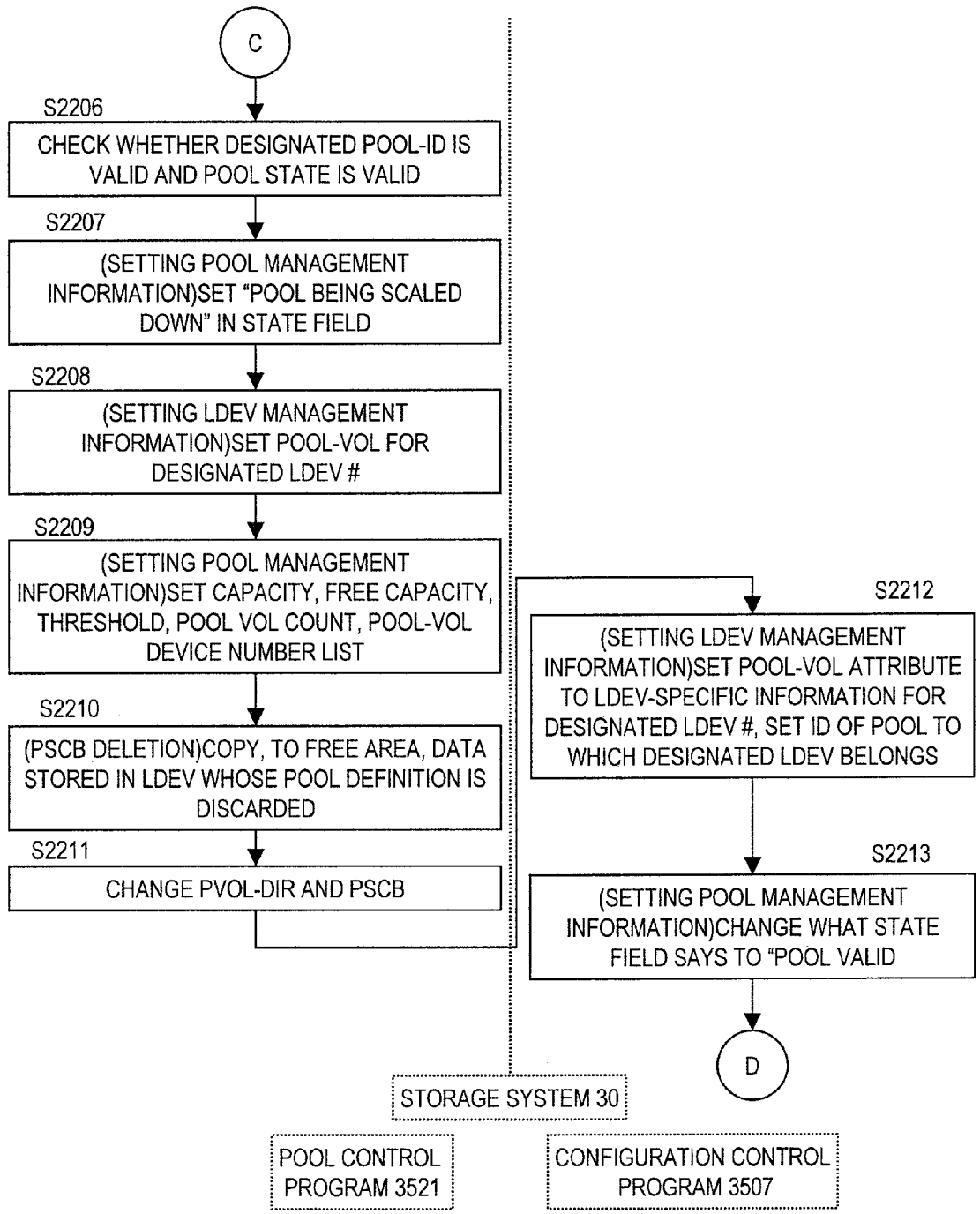
FIG. 21 is a flow chart for scale down of a storage pool according to the first embodiment of this invention.

FIG. 21 is a flow chart for scale down of a storage pool.

Storage pool scale down is processing to shrink the capacity of a storage pool by removing, from the storage pool, first type LDEVs that have been set in the storage pool and thus reducing the first type LDEV count of the storage pool.

Storage pool scale down is executed by the storage configuration management program 2404 of the storage system management apparatus 20.

The storage system management apparatus 20 and the command control program of the storage system 30 execute their respective processing described above with reference to FIG. 12A. That is, in the first step of the processing, the administrator inputs information on a first type LDEV to be removed from a storage pool (the step S2001). The storage configuration management program 2404 sends, to the storage system 30, an instruction command containing the information set by the administrator to scale down a storage pool (the step S2002). In the storage system 30, the command control program 3501 receives this command (the step S2003). The command control program 3501 rejects the received instruction command in the case where what is instructed by the command is not valid (the step S2004).

When the received instruction command is about scaling down a storage pool, the command control program 3501 forwards the received instruction command to the pool control program 3507. The pool control program 3507 receives the instruction command and executes storage pool scale down processing (the step S2005).

Referring now to FIG. 21, the pool control program 3507 first checks whether the POOL-ID designated in the instruction command is valid or not. The pool control program 3507 then obtains, from the POOL management information 3521, POOL-specific information for the POOL-ID designated in the instruction command to check whether or not the POOL state field in the obtained POOL-specific information says "valid" (a step S2206). In the case where the POOL-ID is invalid, or the POOL is not in a valid state (for example, when the POOL is invalid, being expanded, or being scaled down), the instruction command is rejected.

The instruction command is rejected also when data is in the first type LDEV that is to be removed from the storage pool and there is no space to evacuate the data to in other storage areas of the storage system 30.

Next, the pool control program 3507 sets "POOL being scaled down" to the state field of the obtained POOL-specific information (a step S2207).

The pool control program 3507 next obtains LDEV-specific information of the first type LDEV designated in the instruction command, that is, LDEV-specific information of the first type LDEV to be removed from the storage pool as instructed by the instruction command, and deletes the POOL-ID from this LDEV-specific information (a step S2208). The pool control program 3507 next sets the capacity, the free capacity, a threshold, a POOL-VOL count, and a POOL-VOL device list to the POOL-specific information for the POOL-ID designated in the instruction command (a step S2209). As the POOL-VOL count, the total count of first type LDEVs after scale down is set to the POOL-specific information. As the POOL-VOL device list, information of first type LDEVs that remain after scale down is set to the POOL-specific information.

Next, in the case where data is stored in a first type LDEV that is to be removed from the storage pool, the pool control program 3507 copies the data to a free area of another first type LDEV (a step S2210). The free area to which the data is to be copied may be in a first type LDEV that is set in the same storage pool, or may be in a first type LDEV that is set in a different storage pool or in no storage pool. Next, the PSCB 3524 of a first type LDEV that is to be removed from the storage pool is deleted from the VVOL-DIR 3523 (a step S2211). "Unused" is set to the deleted PSCB 3524.

Through this processing of the pool control program 3507, an LDEV is removed from a storage pool and the storage pool is thus scaled down.

After the storage pool is scaled down, the configuration control program 3503 sets the LDEV management information 3512 (a step S2212). LDEV-specific information of the first type LDEV that has been removed from the storage pool is obtained from the LDEV management information 3512. An identifier (POOL-VOL attribute) stored as the device attribute 35128 is deleted from the obtained LDEV-specific information. A POOL-ID stored as the POOL-ID 351301 is also deleted from the obtained LDEV-specific information.

Next, the configuration control program 3503 changes the state of the POOL-ID from "POOL being scaled down" to "POOL valid" in the POOL management information 3521 (a step S2213).

Returning to FIG. 12A, upon completion of the above processing, the command control program 3501 notifies the storage system management apparatus 20 of the success of the command (the step S2015).

Received response from the command by the storage system 30 (the step S2016), the storage configuration management program 2404 of the storage system management apparatus 20 ends the processing.

A storage pool is scaled down through this processing.

Figure 22:
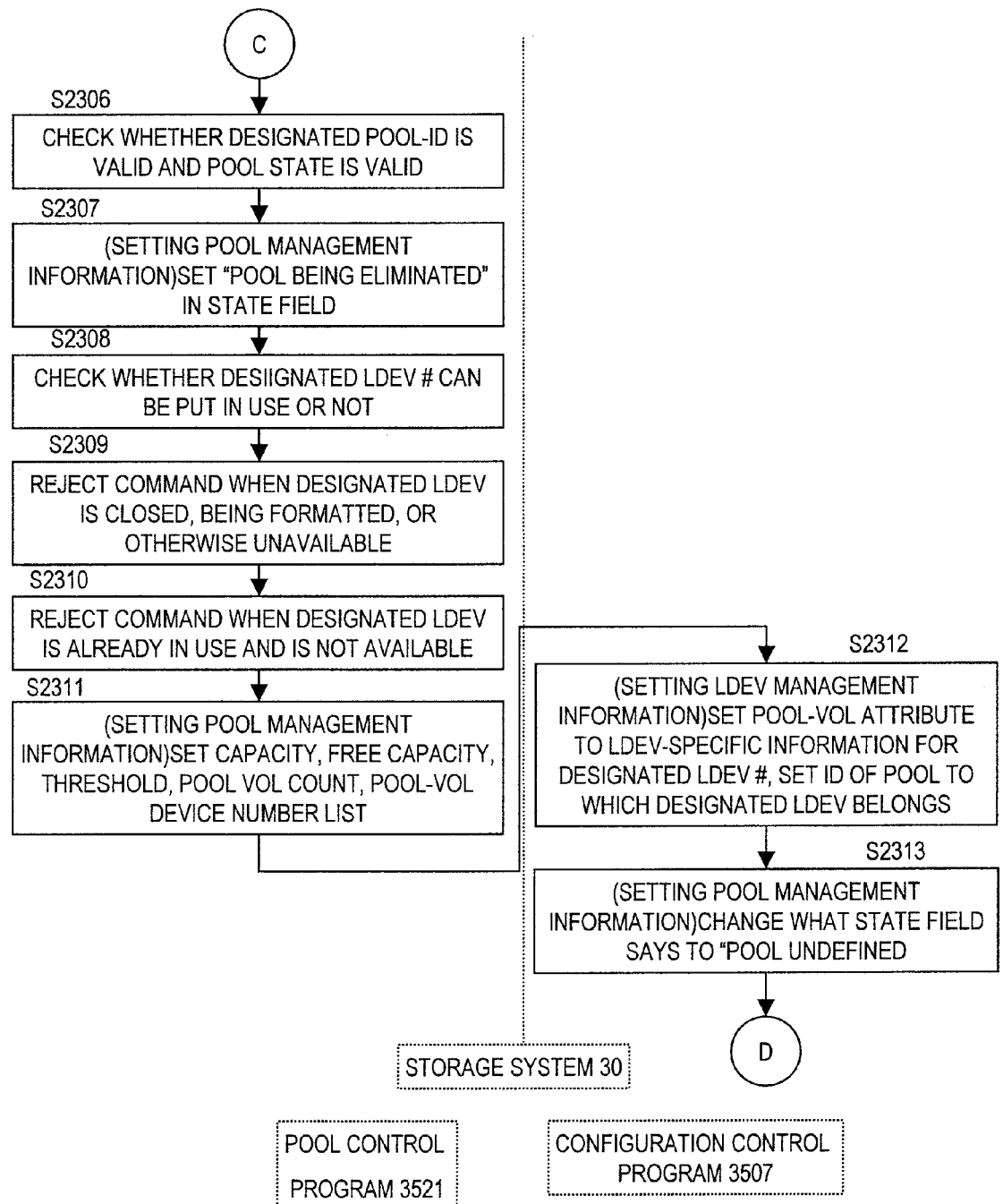
FIG. 22 is a flow chart for elimination of a storage pool according to the first embodiment of this invention.

FIG. 22 is a flow chart for elimination of a storage pool.

Storage pool elimination is processing to eliminate a storage pool by removing from the storage pool every first type LDEV that is set in the storage pool.

Storage pool elimination is executed by the storage configuration management program 2404 of the storage system management apparatus 20.

The storage system management apparatus 20 and the command control program of the storage system 30 execute their respective processing described above with reference to FIG. 12A. In the first step of the processing, the administrator inputs information on a storage pool to be eliminated (the step S2001). The storage configuration management program 2404 sends, to the storage system 30, an instruction command containing the information set by the administrator to eliminate a storage pool (the step S2002). In the storage system 30, the command control program 3501 receives this command (the step S2003). The command control program 3501 rejects the received instruction command in the case where what is instructed by the command is not valid (the step S2004).

When the received instruction command is about eliminating a storage pool, the command control program 3501 forwards the received instruction command to the pool control program 3507. The pool control program 3507 receives the instruction command and executes storage pool eliminating processing (the step S2005).

Referring now to FIG. 22, the pool control program 3507 first checks whether the POOL-ID designated in the instruction command is valid or not. The pool control program 3507 then obtains, from the POOL management information 3521, POOL-specific information for the POOL-ID designated in the instruction command to check whether or not the POOL state field in the obtained POOL-specific information says "valid" (a step S2306). In the case where the POOL-ID is invalid, or the POOL is not in a valid state (for example, when the POOL is invalid, being expanded, or being scaled down), the instruction command is rejected.

The instruction command is rejected also when data is stored in a first type LDEV that is set in the storage pool of the POOL-ID designated in the instruction command. This is because once a storage pool is eliminated, data of a first type LDEV set in the storage pool is lost.

Next, the pool control program 3507 sets "POOL being eliminated" to the state field of the obtained POOL-specific information (a step S2307).

The pool control program 3507 next checks whether the LDEV number designated in the instruction command can be put into use or not (a step S2308).

Specifically, in the case where the first type LDEV that is identified by the LDEV number designated in the instruction command is blocked or being formatted, the first type LDEV cannot be put into use and accordingly the instruction command is rejected (a step S2309).

The first type LDEV that is identified by the LDEV number designated in the instruction command is not available, so the instruction command is rejected also when the first type LDEV is already in use (for example, when a path has already been defined for the first type LDEV, when the copy function or the like is using the first type LDEV, or when the first type LDEV is put aside as where data is to be copied next) (a step S2310).

When the instruction command is accepted, the pool control program 3507 initializes all of the capacity, free capacity, threshold, POOL-VOL count, and POOL-VOL device list of the POOL-specific information for the POOL-ID designated in the instruction command (a step S2311).

Through this processing of the pool control program 3507, a storage pool is eliminated.

After the storage pool is eliminated, the configuration control program 3503 sets the LDEV management information 3512 (a step S2312). LDEV-specific information of a first type LDEV that has belonged to the eliminated storage pool is obtained from the LDEV management information 3512. An identifier (POOL-VOL attribute) stored as the device attribute 35128 is deleted from the obtained LDEV-specific information. A POOL-ID stored as the POOL-ID 351301 is also deleted from the obtained LDEV-specific information.

Next, the configuration control program 3503 changes the state of the POOL-ID from "POOL being eliminated" to "POOL undefined" in the POOL management information 3521 (a step S2313).

Returning to FIG. 12A, upon completion of the above processing, the command control program 3501 notifies the storage system management apparatus 20 of the success of the command (the step S2015).

Received response from the command by the storage system 30 (the step S2016), the storage configuration management program 2404 of the storage system management apparatus 20 ends the processing.

A storage pool is eliminated through this processing.

Access to a virtual volume from the host computer 10 will be described next.

Figure 23A:
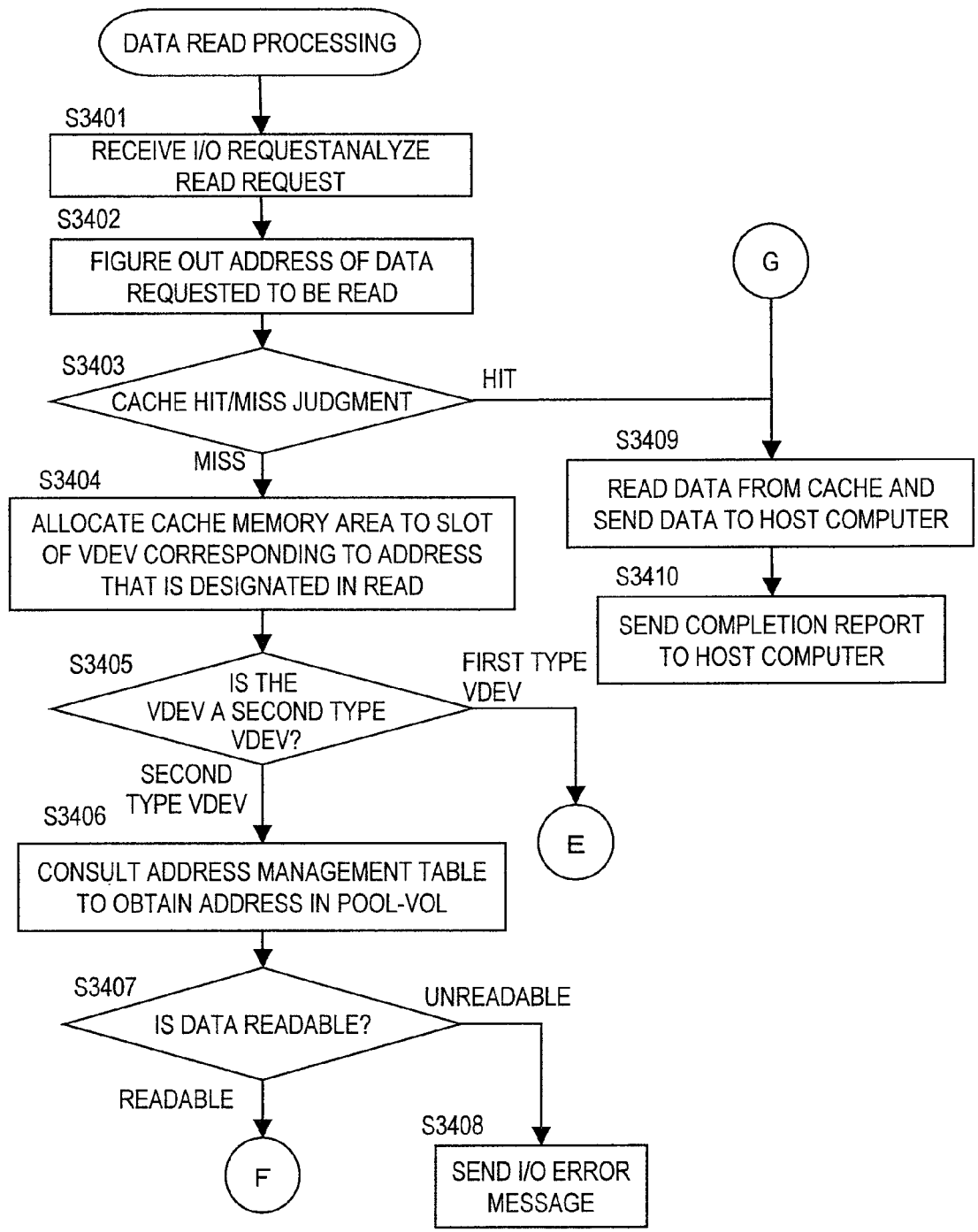
FIG. 23A is a flow chart for a read request according to the first embodiment of this invention.
Figure 23B:
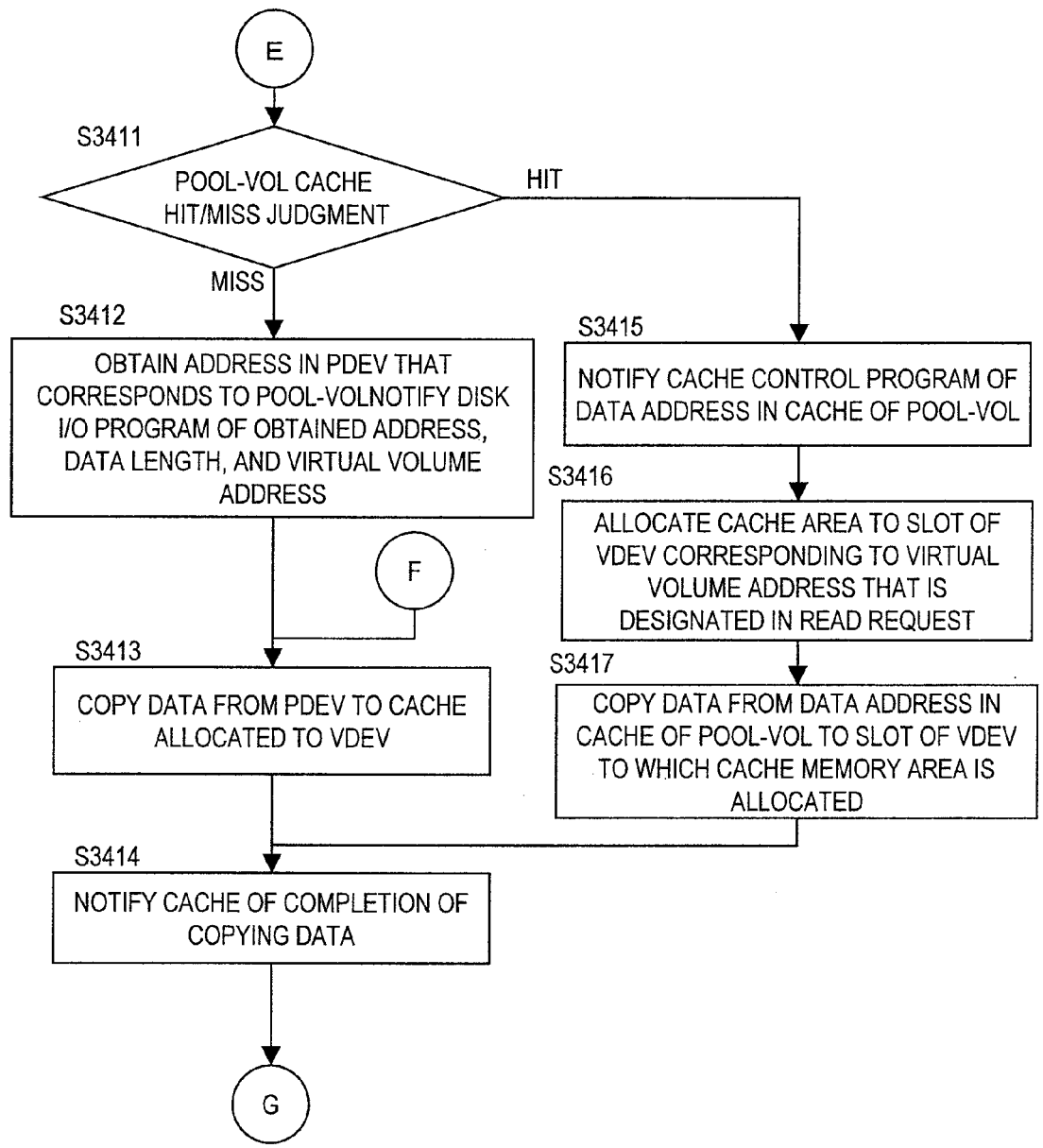
FIG. 23B is a flow chart for a read request according to the first embodiment of this invention.

FIGS. 23A and 23B are flow charts of processing executed when the host computer 10 makes a data read request to a target device in the storage system 30.

The host computer 10 sends an I/O request with a target device address designated. This I/O request is a data read request.

In the storage system 30, the command control program 3501 receives an I/O request from the host computer 10. In the case where what is requested by the received I/O request is invalid, the request is rejected. Otherwise, the I/O request is analyzed (a step S3401). As a result of the analysis, the command control program 3501 knows that the I/O request is a data read request.

Next, the command control program 3501 obtains, from the received request, the address of a target device from which data is to be read (a step S3402).

The command control program 3501 next executes cache hit/miss judging processing (a step S3403). Specifically, the command control program 3501 consults the storage cache memory 32 to determine whether or not the requested data is in an area corresponding to the obtained address.

When it is judged as a cache hit, the command control program 3501 reads data out of the corresponding area of the storage cache memory 32, and sends the read data to the host computer 10 (a step S3409). Then the command control program 3501 sends a read request completion report to the host computer 10 (a step S3410) and ends the processing.

On the other hand, when it is judged as a cache miss, the command control program 3501 first allocates an area of the storage cache memory 32 to a slot of a VDEV that corresponds to the address designated in the request (a step S3404).

The command control program 3501 next judges whether the VDEV that corresponds to the address designated in the request is a first type VDEV or a second type VDEV (a step S3405).

When the VDEV is judged as a first type VDEV, the processing moves to a step S3413 of FIG. 23B.

When the VDEV is judged as a second type VDEV, the command control program 3501 obtains, via the pool control program 3507, the address of the second type VDEV in a POOL-VOL (a step S3406).

Next, the command control program 3501 judges whether data stored at the obtained address is readable or not (a step S3407). Specifically, the command control program 3501 judges whether the state of a POOL-VOL corresponding to the obtained address is normal or not. In the case where the POOL-VOL is in a failure-induced blocked state and data cannot be read out, the command control program 3501 sends an I/O error message to the host computer 10 (a step S3408).

In the case where the POOL-VOL is in a normal state or a puncture blocked state and data can be read out, cache hit/miss in the POOL-VOL is judged (a step S3411). Specifically, the command control program 3501 consults the storage cache memory 32 to determine whether or not the requested data is in an area corresponding to the POOL-VOL.

When it is judged as a cache hit, the command control program 3501 first notifies the cache control program 3509 of an address at which the requested data is stored in the storage cache memory 32 (a step S3415).

The cache control program 3509 allocates the area of the storage cache memory 32 to a slot of a second type VDEV that corresponds to the virtual volume address designated in the request (a step S3416).

The cache control program 3509 then copies the requested data to the allocated area of the storage cache memory 32 from the address in the storage cache memory 32 that corresponds to the address in the POOL-VOL at which the requested data is stored (a step S3417). As the data copying is completed, the cache control program 3509 notifies the command control program 3501 of the data copy completion (a step S3418).

Notified of the data copy completion, the command control program 3501 reads data out of the corresponding cache memory area and sends the read data to the host computer 10 (a step S3409). Then the command control program 3501 sends a read request completion report to the host computer 10 (a step S3410) and ends the processing.

On the other hand, when it is judged in the step S3411 as a cache miss, the command control program 3501 first consults the address management table 3511 to obtain an address in the PDEV 34 that corresponds to the address in the POOL-VOL at which the requested data is stored. The command control program 3501 then notifies the disk I/O program 3505 of the obtained address, the length of the requested data, and the address in the virtual volume that is designated in the request (a step S3412).

Notified of the addresses and the data length, the disk I/O program 3505 reads the requested data at the address in the PDEV 34, and copies the read data to the area of the storage cache memory 32 that is allocated in the step S3404 (the step S3413). As the data copying is completed, the disk I/O program 3505 notifies the command control program 3501 of the data copy completion (a step S3418).

Notified of the data copy completion, the command control program 3501 reads data out of the corresponding cache memory area and sends the read data to the host computer 10 (the step S3409). Then the command control program 3501 sends a read request completion report to the host computer 10 (the step S3410) and ends the processing.

Through the above processing, a data read request made by the host computer 10 is completed.

Described next is how a data write request is processed.

Figure 24A:
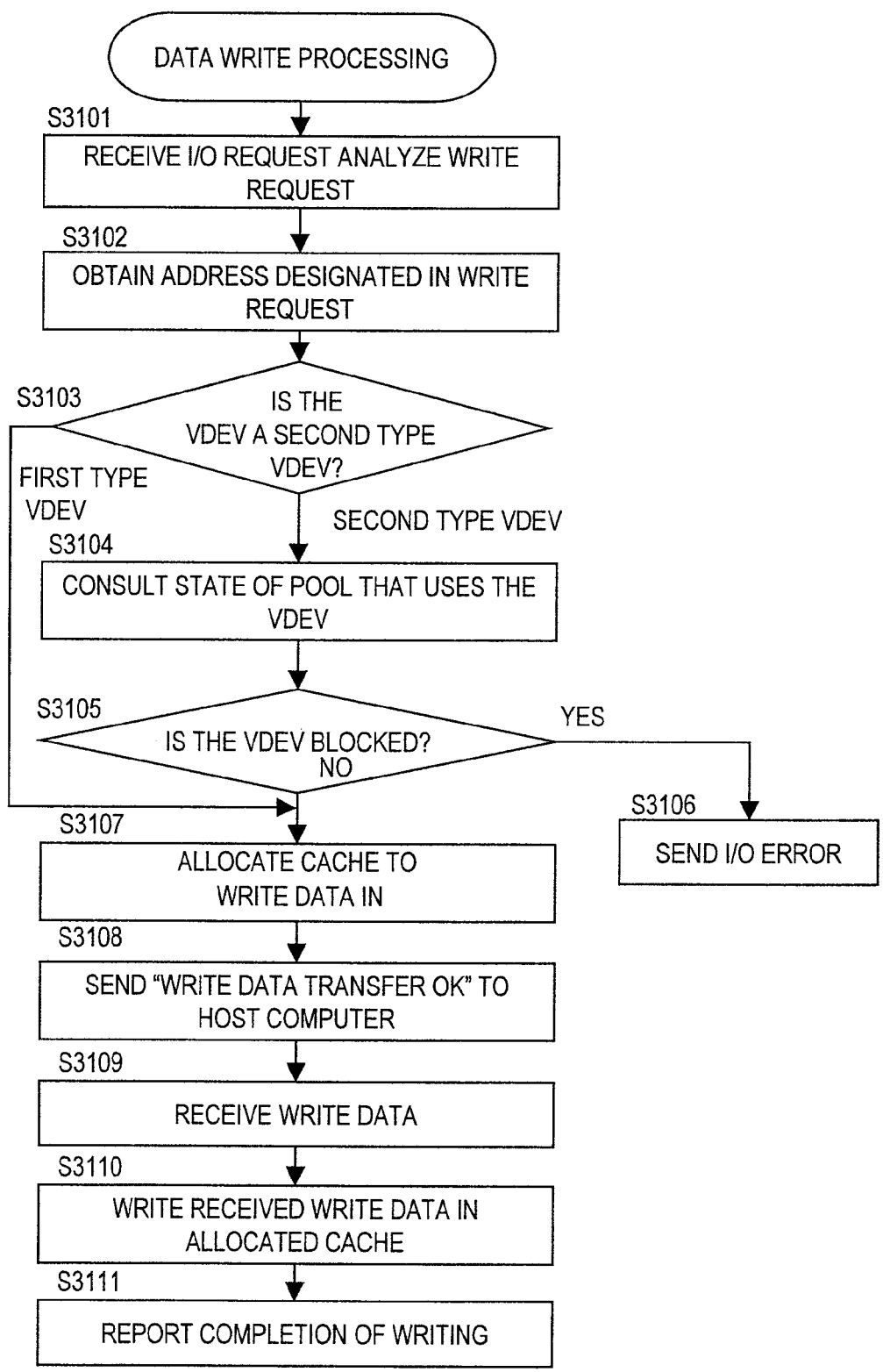
FIG. 24A is a flow chart for a write request according to the first embodiment of this invention.
Figure 24B:
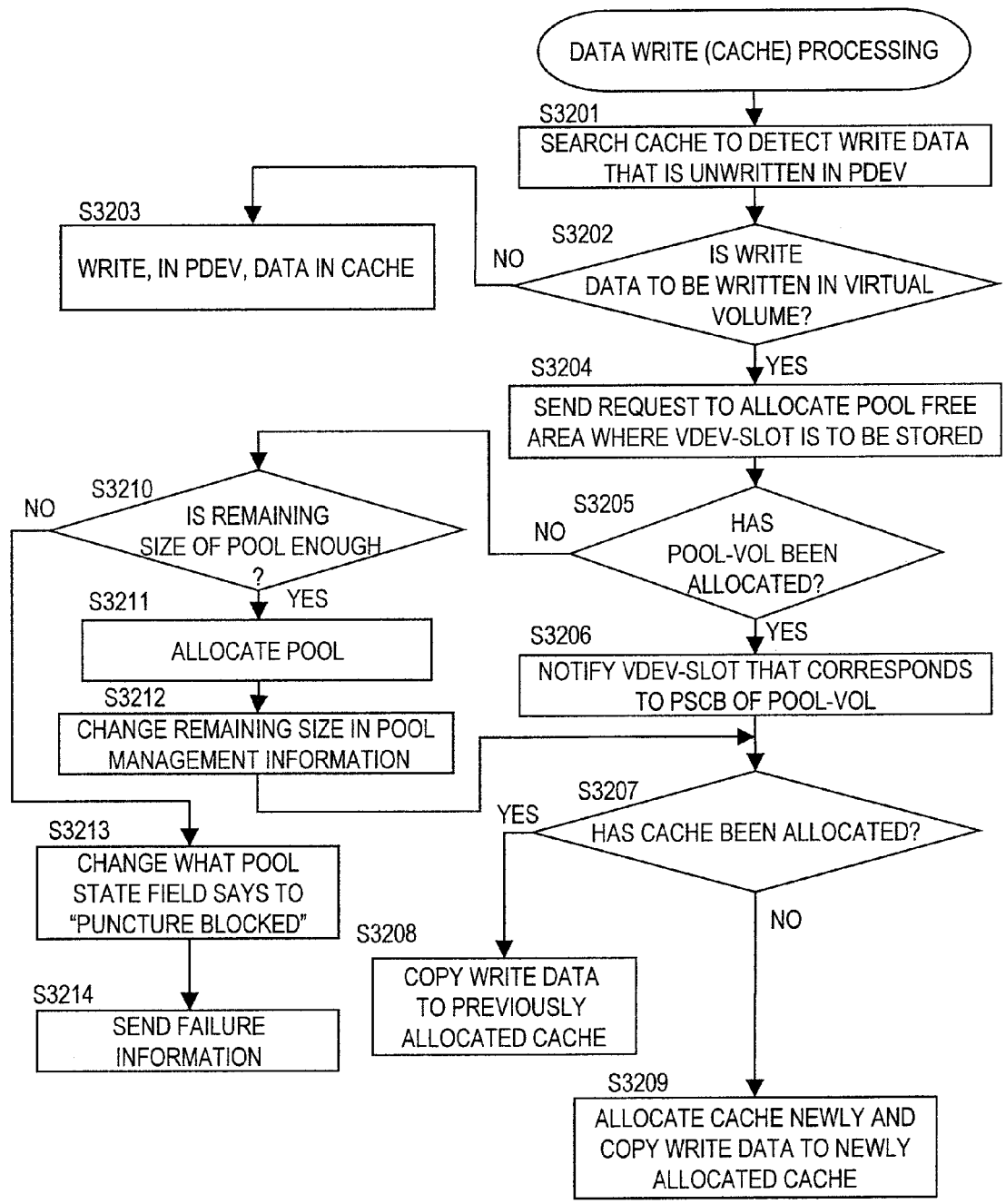
FIG. 24B is a flow chart for a write request according to the first embodiment of this invention.
Figure 24C:
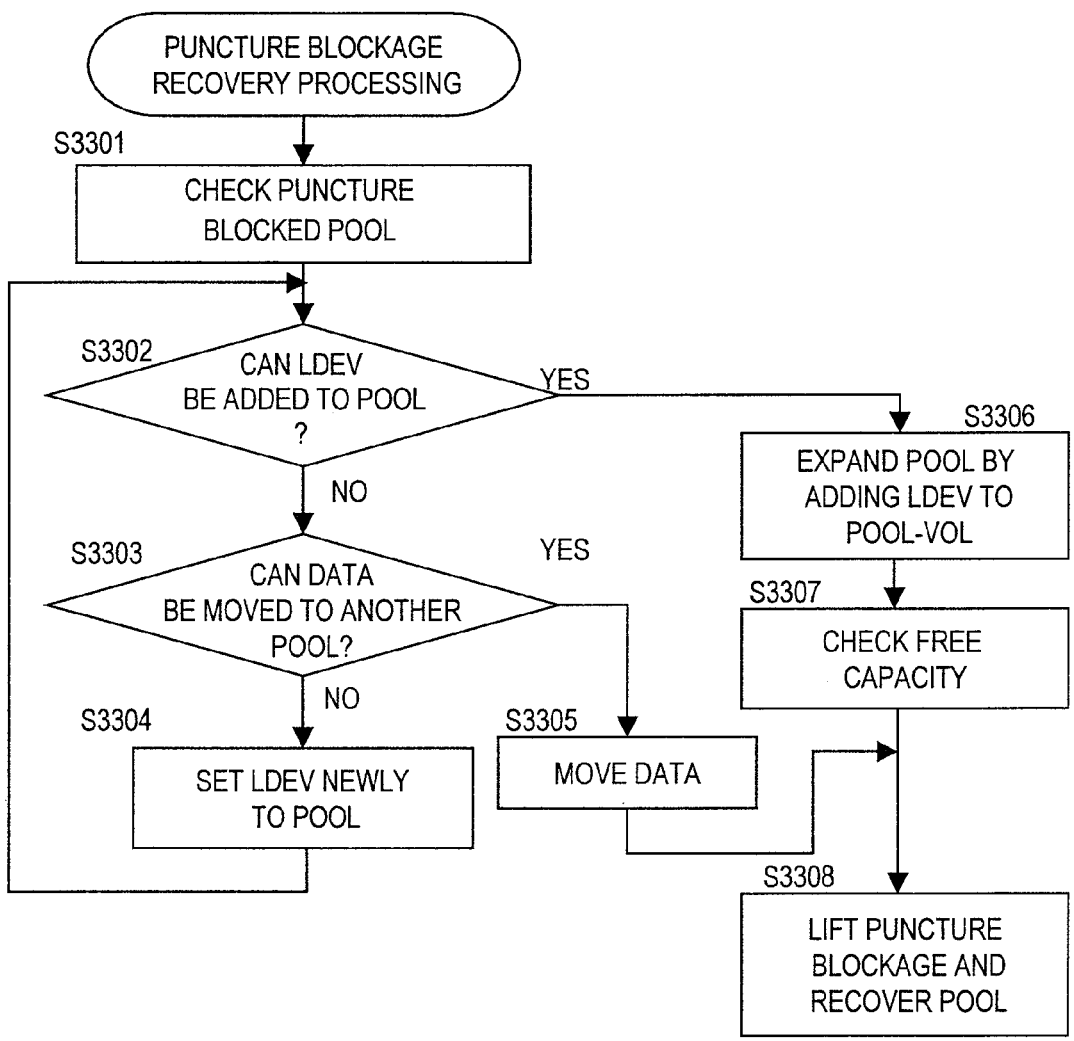
FIG. 24C is a flow chart for a write request according to the first embodiment of this invention.

FIGS. 24A to 24C are flow charts of processing executed when the host computer 10 makes a data write request to a target device in the storage system 30.

The host computer 10 sends an I/O request with a target device address designated. This I/O request is a data write request.

In the storage system 30, the command control program 3501 receives an I/O request from the host computer 10. In the case where what is requested by the received I/O request is invalid, the request is rejected. Otherwise, the I/O request is analyzed (a step S3101). As a result of the analysis, the command control program 3501 knows that the I/O request is a data write request.

Next, the command control program 3501 obtains, from the received write request, the address of a target device in which data is to be written (a step S3102).

The command control program 3501 next judges whether the VDEV that corresponds to the obtained address is a first type VDEV or a second type VDEV (a step S3103).

When the VDEV is judged as a first type VDEV, the processing moves to a step S3107.

When the VDEV is judged as a second type VDEV, the state of a POOL-VOL used as the second type VDEV is obtained (a step S3104). The command control program 3501 judges whether the second type VDEV corresponding to the POOL-VOL is in a blocked state or not (a step S3105). When the second type VDEV is in a blocked state, the VDEV cannot be accessed and accordingly the command control program 3501 sends an I/O error message to the host computer 10 (a step S3106).

When it is judged that the second type VDEV is not blocked, the command control program 3501 assigns an area of the storage cache memory 32 to the address designated in the request (the step S3107).

Next, the command control program 3501 sends, to the host computer 10 that has made the request, a message saying that write data can be transferred (a step S3108). Receiving the message, the host computer 10 sends write data to the storage system 30.

The command control program 3501 receives the write data sent by the host computer 10 (a step S3109), and writes the write data in the area in the storage cache memory 32 that is assigned in the step S3107 (a step S3110).

Upon finishing writing the write data in the storage cache memory 32, the command control program 3501 sends a write request completion report to the host computer 10 (a step S3111) and ends the processing.

Meanwhile, the cache control program 3509 is monitoring whether the storage cache memory 32 has write data that is unwritten in a disk device (PDEV 34) (a step S3201 of FIG. 24B).

In the case where unwritten write data is detected, the cache control program 3509 judges whether the volume in which the write data is to be written is a virtual volume or not (a step S3202). Specifically, the cache control program 3509 judges whether a slot number of a VDEV that corresponds to the storage cache memory 32 is of a first type VDEV or a second type VDEV.

When it is judged that the volume in which the write data is to be written is not a virtual volume, in other words, when it is judged that the write data is to be written in a first type VDEV, the cache control program 3509 instructs the disk I/O program 3505 to write the data in the PDEVs 34, 34, 34 . . . . Receiving the instruction, the disk I/O program 3505 writes the data in the disks (a step S3203).

On the other hand, when it is judged that the volume in which the write data is to be written is a virtual volume, in other words, when it is judged that the write data is to be written in a second type VDEV, the cache control program 3509 sends, to the pool control program 3507, an allocation request for allocating a slot of the second type VDEV in which the write data is to be written to a POOL-VOL (a step S3204).

Receiving the allocation request, the pool control program 3507 first judges whether or not any POOL-VOL has been allocated to the second type VDEV which is a virtual volume (a step S3205).

When it is judged that a POOL-VOL has already been allocated to the second type VDEV, the PSCB 3524 of this POOL-VOL is consulted to obtain a corresponding first type VDEV slot. The obtained VDEV slot is notified to the command control program 3501 (a step S3206).

The command control program 3501 judges whether or not the first type VDEV slot has been allocated to an area of the storage cache memory 32 (a step S3207).

When it is judged that the slot has been allocated to an area of the storage cache memory 32, the command control program 3501 copies the write data to the allocated area of the storage cache memory 32 (a step S3208).

When it is judged that the slot has not been allocated to an area of the storage cache memory 32, the command control program 3501 allocates an area corresponding to the first type VDEV slot to the storage cache memory 32. The command control program 3501 then copies the write data to the allocated area (a step S3209).

On the other hand, when it is judged in the step S3205 that no POOL-VOL has been allocated to the second type VDEV, the pool control program 3507 first consults the POOL management information 3521 to check the remaining size of a POOL-VOL and determine whether the POOL-VOL has enough capacity left to store the write data (a step S3210).

When it is judged that the remaining size of the POOL-VOL is enough, the pool control program 3507 allocates the PSCB 3524 of the POOL-VOL to the VVOL-DIR 3523 of the virtual volume. In this way, an area of the virtual volume is newly allocated to the POOL-VOL (a step S3211). Then the remaining size in the POOL management information 3521 is changed accordingly (a step S3212), and the processing moves to the step S3207.

On the other hand, when it is judged that the remaining size of the POOL-VOL is not enough, the pool control program 3507 changes what the state field in the POOL management information 3521 says to "puncture blocked" (a step S3213). Then the pool control program 3507 notifies the storage system management apparatus 20, as well as the host computer 10 that has made the I/O request, of the puncture blockage (a step S3214) and ends the processing.

Through the above processing, a data write request made by the host computer 10 is completed.

When detecting in the step S3213 of FIG. 24B that the POOL-VOL is in a puncture blocked state (a step S3301 of FIG. 24C), the pool control program 3507 first judges whether or not there is a first type LDEV that can be added to this POOL-VOL (a step S3302). Specifically, the pool control program 3507 judges whether or not there is an unused first type LDEV among first type LDEVs set in other POOL-VOLs (POOL-IDs) than the POOL-VOL that is in a puncture blocked state.

When it is judged that there is a first type LDEV that can be added, the pool control program 3507 adds this first type LDEV to the POOL-VOL and executes expansion of the storage pool (a step S3306). The pool control program 3507 then checks the new free area of the POOL-VOL (a step S3307). Once it is confirmed that a sufficient area is secured, the puncture blockage of the POOL-VOL is canceled and the POOL-VOL is recovered (a step S3308).

When it is judged that there is no first type LDEV that can be added to the POOL-VOL, the pool control program 3507 judges whether or not data in the POOL-VOL that is in a puncture blocked state can be moved to another POOL-VOL that has a free area (a step S3303).

When it is judged that the data cannot be moved out, the pool control program 3507 newly sets a first type LDEV in the storage pool (a step S3304), and the processing returns to the step S3302.

When it is judged that the data can be moved out, the pool control program 3507 moves the data to a POOL-VOL that has a free area (a step S3305). Then the puncture blockage of the POOL-VOL is lifted and the POOL-VOL is recovered (the step S3308).

Through the above processing, a necessary capacity is secured for a POOL-VOL of a storage pool when the POOL-VOL does not have enough storage area.

Described next is how a failure in a disk drive device (PDEV) is processed.

Figure 25:
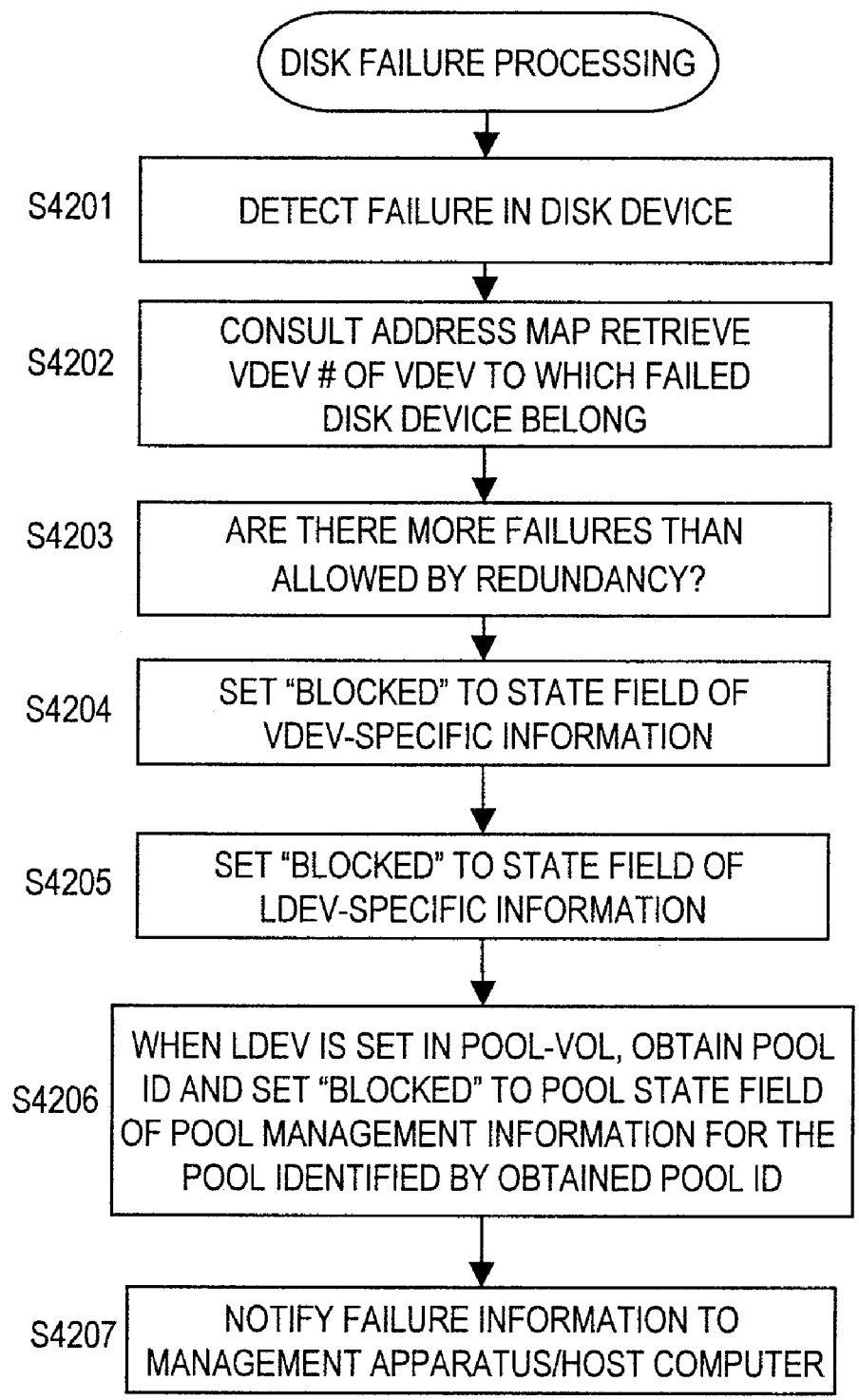
FIG. 25 is a flow chart of disk failure processing according to the first embodiment of this invention.

FIG. 25 is a flow chart for when a disk failure occurs.

The disk I/O program 3505 reads data out of or write data into the PDEV 34 as instructed. In the case where data is unsuccessfully read out of the PDEV 34, the disk I/O program 3505 retries the data reading. After a given number of retries fails, the disk I/O program 3505 judges that the PDEV 34 is suffering from some kind of failure, and notifies the drive diagnostic program 3510 of the detection of a failure in the disk device of the PDEV 34 from which data is to be read as requested by the read request.

Similarly, in the case where data write fails, the disk I/O program 3505 retries the data writing. After a given number of retries fails, the disk I/O program 3505 notifies the drive diagnostic program 3510 of the detection of a failure in the disk device of the PDEV 34 into which data is to be written as requested by the write request.

Meanwhile, the drive diagnostic program 3510 regularly starts up diagnostic processing to make diagnosis of a failure occurring in the disk device of the PDEV 34.

When notified of detection of a failure in the disk device by the disk I/O program 3505 or when detecting a disk device failure through the diagnostic processing (a step S4201), the drive diagnostic program 3510 consults the address management table 3511 to obtain the VDEV number of a first type VDEV to which the PDEV 34 containing the failed disk device belongs (a step S4202).

The address management table is again consulted to obtain disk devices of the PDEVs 34, 34, 34 . . . that constitute the first type VDEV having the obtained VDEV number. For every disk device obtained, whether there is a failure or not is checked. In the case where there are more failures than allowed by the redundancy set to this VDEV, the VDEV is blocked. For instance, in the case where two disk devices belonging to the same parity group suffer a failure in a RAID configuration that has two data disks and one parity, it is unlikely that data of this parity group is recovered. Therefore, a VDEV to which the disk devices belong is blocked (a step S4203). Next, the pool control program 3507 instructs the configuration control program 3503 to block the VDEV. The configuration control program 3503 sets "blocked" to the attribute field of VDEV-specific information for the VDEV number of this first type VDEV. The VDEV is thus blocked (a step S4204).

The pool control program 3507 next instructs the configuration control program 3503 to block the LDEV. The configuration control program 3503 sets "blocked" to the attribute field of LDEV-specific information for the LDEV number of the first type LDEV. The LDEV is thus blocked (a step S4205).

Next, whether the blocked LDEV is set in a storage pool or not is judged. The pool control program 3507 first consults POOL-ID contained in the LDEV-specific information for the LDEV number of the first type LDEV. When it is judged that the LDEV is set in a POOL-VOL, the pool control program 3507 instructs the configuration control program 3503 to block the POOL-VOL. The configuration control program 3503 sets the state of the POOL-VOL of a storage pool that is identified by the POOL-ID to "blocked". The POOL-VOL is thus blocked (a step S4206).

The pool control program 3507 then notifies the host computer 10 and the storage system management apparatus 20 of the occurrence of a failure and blockage of the POOL-VOL (a step S4207).

In the case where there is a failure in a disk device, a storage pool is blocked through the above processing.

Figure 26:
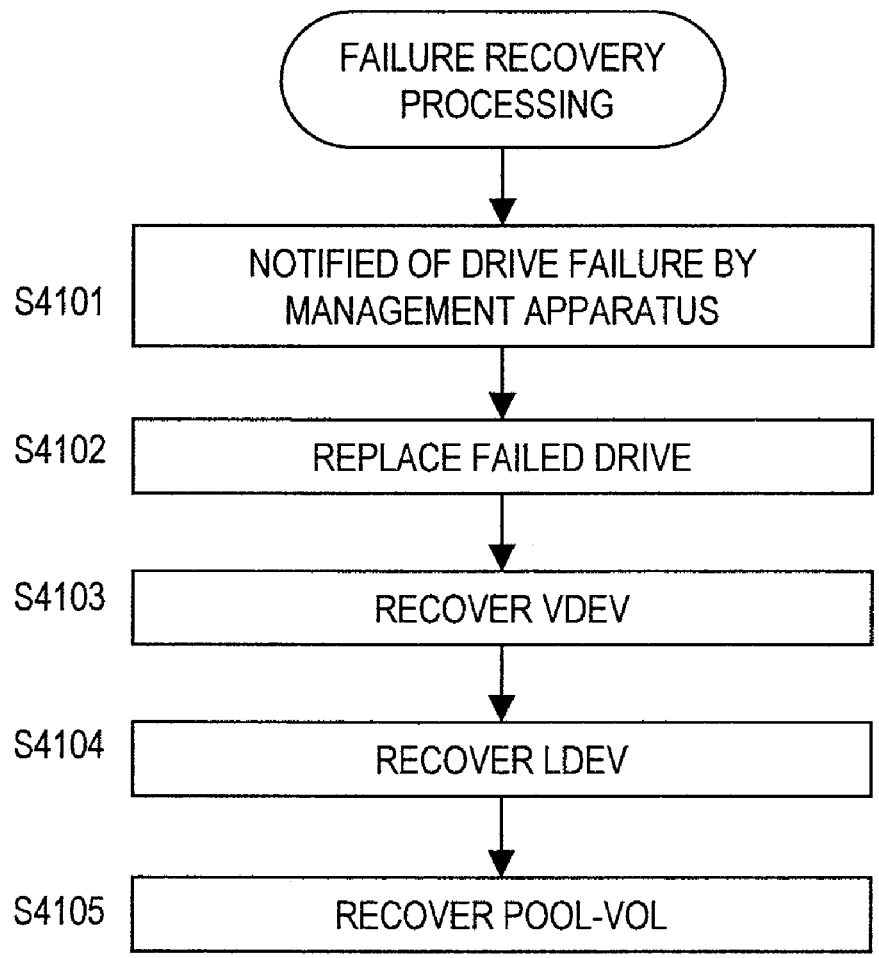
FIG. 26 is a flow chart of disk recovery processing according to the first embodiment of this invention.

Described next in FIG. 26 is processing for recovery from a failure in a disk drive device (PDEV).

When notified of occurrence of a failure and blockage of a POOL-VOL by the storage system 30, the storage system management apparatus 20 notifies the administrator of the failure and the blockage (a step S4101).

Notified of the failure and the blockage, the administrator replaces the failed disk drive device of the storage system 30 (a step S4102).

The configuration control program 3503 of the storage system 30 detects that the failure of the disk drive device is eradicated by replacing the disk drive device. Then a first type VDEV in a blocked state is recovered (a step S4103) and a first type LDEV in a blocked state is recovered (a step S4104). A POOL-VOL in a blocked state is also recovered (a step S4105).

A POOL-VOL recovers from blockage through the above processing.

As has been described, in a computer system according to the first embodiment of this invention, a second type VDEV, which is a virtual area, is set to set a second type LDEV. The second type LDEV is associated with a first type LDEV constituted of the PDEV 34, which is a physical device, to thereby make the second type LDEV usable as a physical device storage area. The host computer 10 accesses the second type LDEV as a virtual volume. The association between the first type LDEV and the second type LDEV is set by allocating the PSCB 3524 to the VVOL-DIR 3523. By changing allocation between the PSCB 3524 and the VVOL-DIR 3523, storage areas of a virtual volume can dynamically be changed. Thus a virtual volume can be set to have a capacity larger than the total storage capacity of physical devices provided in the storage system 30, and data in a computer system is accessed with an enhanced degree of freedom.

The disk I/O program 3505 in the storage system 30 receives an I/O request from the host computer 10 and, in the case where a device to be accessed as requested by the I/O request is a first type LDEV set in a storage pool, rejects the request. In other words, the disk I/O program 3505 blocks access from the outside to a first type LDEV that is allocated to a second type LDEV as a virtual volume. Thus, unwary acceptance of access to a first type LDEV that corresponds to a virtual volume can be avoided and security of the storage system is improved.

The use of a VDEV, which is a device of this invention having a storage area, and an LDEV, which is defined from the VDEV, makes it possible to expand/scale down the capacity of a POOL on an LDEV basis without being restrained by the capacity of physical PDEVs.

The LDEV itself, which is defined from the VDEV, can be defined as a logical storing unit having an arbitrary capacity regardless of the capacity of PDEVs.

The VDEV and LDEV of this invention also facilitate introduction of storage system management software that can manage, on a device basis, expansion/scale down of a POOL and the individualities of a POOL (for example, a POOL specialized for sequential access).

Second Embodiment

Now, a computer system according to a second embodiment of this invention is described.

In this embodiment, the computer system is built as described in the first embodiment and, at the time the power is turned off, the storage system 30 evacuates management information to an area set in a storage pool. This area is called a system area.

Figure 27:
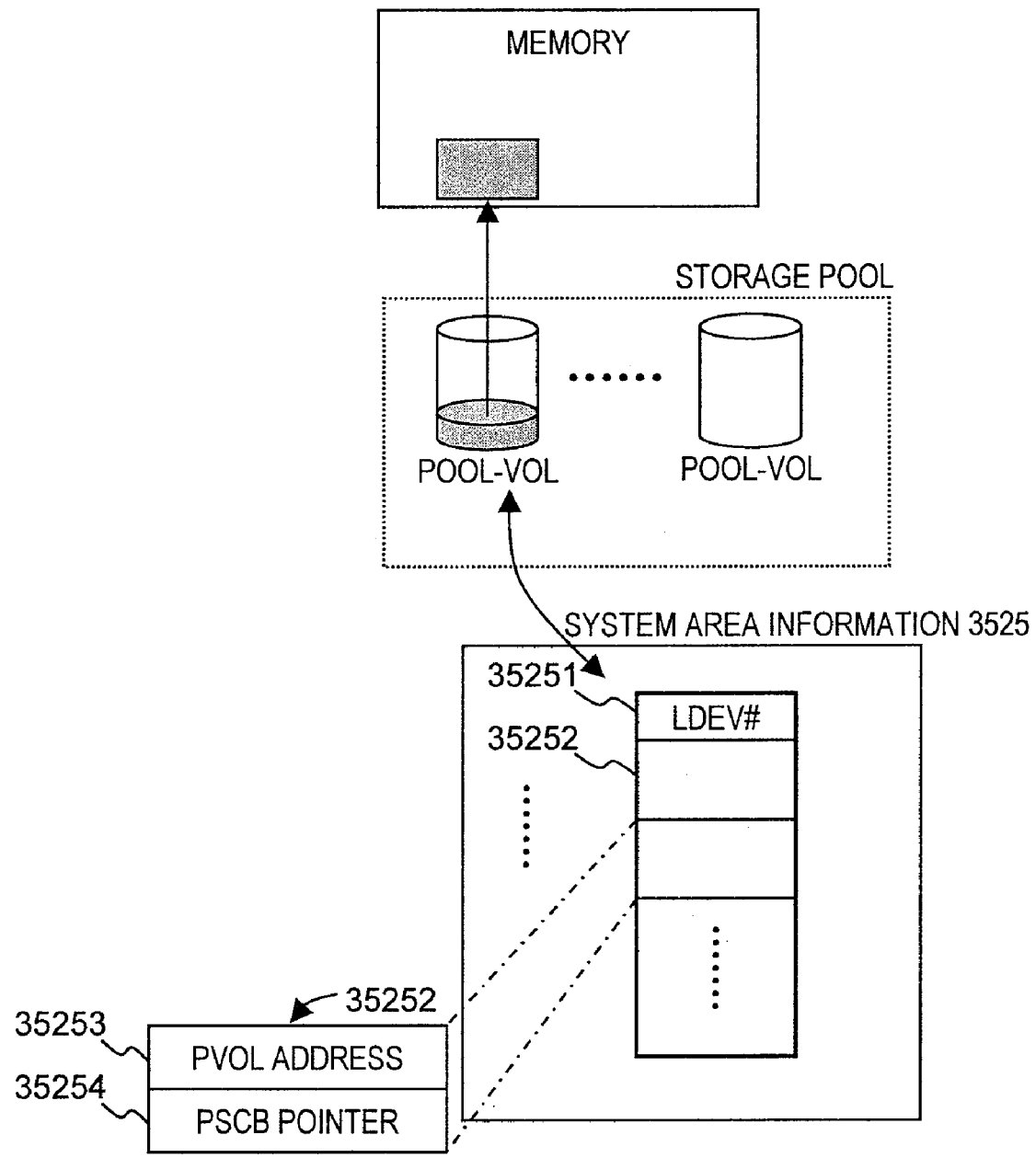
FIG. 27 is an explanatory diagram of a storage pool and a system area according to a second embodiment of this invention.

FIG. 27 is an explanatory diagram of a storage pool and the system area according to this embodiment.

The configuration of the system area is stored in the system area information 3525.

The system area information 3525 contains a POOL usage amount counter 35251 and an entry 35252.

The POOL usage amount counter 35231 indicates LDEV information associated with an LDEV of a storage pool. The entry 35252 holds LDEV configuration information of the PVOL 800.

The entry 35252 contains an LDEV number (LDEV #) 35253, a PVOL address 35254, a POOL-VOL address 35255, a PSCB forward pointer 35256 and a PSCB backward pointer 35257.

Stored as the LDEV number (LDEV #) 35253 is the identifier of the LDEV. The PVOL address 35254 indicates the address of the LDEV in the PVOL.

Stored as the POOL-VOL address 35255 is, in the case where the LDEV is allocated to an LDEV of the POOL-VOL 900, the identifier of the POOL-VOL 900.

In the case where the LDEV is allocated to an LDEV of the POOL-VOL 900, identifiers are stored as the PSCB forward pointer 35256 and the PSCB backward pointer 35257. In the case where the LDEV is not allocated to any POOL-VOL, "NULL" is stored in the fields of the pointers 35256 and 35257.

Management information to be evacuated to the system area is information stored in the storage cache memory 32 or in the shared memory 33. Specifically, the management information is cache data stored in the storage cache memory 32 that is not destaged yet. The management information is also storage area configuration information (e.g., VDEV, LDEV. volume, storage pool, and path definition information) of the storage system 30.

As the power is turned off, the storage system 30 evacuates the management information to the system area.

At the time the power is turned off, the storage system 30 finds a free PSCB queue from among the PSCBs 3524, 3524, 3524 . . . , and obtains an unused area in a storage pool. The unused area is assigned as the system area. Specifically, the PSCB 3524 that is a free PSCB queue is allocated to each entry 35252 of the system area information 3525. Then the management information is stored in the assigned system area. Information (address and size) of the system area is stored in the non-volatile memory 330 of the storage system 30.

Thereafter, when the power is turned on, the storage system 30 first consults the non-volatile memory 330 to obtain information of the system area where the management information is stored. The storage system 30 then reads the management information stored in the system area and boots the system again. After the system is booted anew, allocation of the PSCB 3524 to the system area is cancelled to return the PSCB 3524 to a free PSCB queue.

As has been described, in a computer system according to the second embodiment of this invention, out of LDEVs that serve as storage areas of a PVOL, unused ones are set as the system area. A special advantage of the second embodiment is that, in the case where the system area is not set in advance as in emergencies where the power is turned off unexpectedly, system information is stored in an unused storage area that is obtained by searching the VVOL-DIR 3524. The computer system is thus improved in usability.

While the present invention has been described in detail and pictorially in the accompanying drawings, the present invention is not limited to such detail but covers various obvious modifications and equivalent arrangements, which fall within the purview of the appended claims.

What is claimed is:

1. A storage system coupled to a host computer and a management apparatus, comprising:
   a plurality of storage devices accessed by the host computer; and
   a control unit that controls the plurality of storage devices, wherein the control unit:
      sets a first-type virtual device corresponding to the plurality of storage devices, the first-type virtual device including a plurality of first-type logical devices,
      wherein the plurality of first-type logical devices includes at least one first first-type logical device and at least one second first-type logical device, the at least one first first-type logical device being allocated to a volume accessible by the host computer;
      sets a second-type virtual device including a second-type logical device, which is a virtual volume accessible by the host computer; and
      allocates each second first-type logical device, of the plurality of first-type logical devices, to a storage pool,
   wherein when the control unit receives first write data for the first first-type logical device included in the first-type virtual device, the control unit stores the first write data in the first first-type logical device, and when the control unit receives second write data for the second-type logical device included in the second-type virtual device, the control unit associates at least one second first-type logical device, of the first-type virtual device and allocated to the storage pool, with the second-type logical device, and stores the second write data in the second first-type logical device,
   wherein the storage system further comprises:
   a memory storing management information, which includes cache data to be destaged and configuration information regarding the configuration of the respective virtual devices, logical devices and volumes; and
   a non-volatile memory,
   wherein in response to the power of the storage system being turned off, the storage system:
   locates an unused area in the storage pool;
   assigns the unused portion as a system area;
   evacuates the management information stored in the memory to the system area; and
   stores in the non-volatile memory the address and size of the system area,
   wherein in response to the power of the storage system subsequently being turned back on, the storage system:
   consults the non-volatile memory to obtain information about the assigned system area where the management information is stored;
   reads the management information in the assigned system area;
   boots the system; and
   cancels the assignment of the unused area as a system area.

2. The storage system according to claim 1, wherein the control unit:
   sets "pool volume attribute" as a device attribute of a second first-type logical device; and allocates an address of the second first-type logical device having the device attribute of "pool volume attribute" to an address of the second-type logical device, thereby associating the second first-type logical device with the second-type logical device.

3. The storage system according to claim 2, wherein the control unit sets an identifier of the storage pool to the second first-type logical device, thereby setting "pool volume attribute" as the device attribute of the second first-type logical device.

4. The storage system according to claim 2, wherein the control unit sets "pool volume attribute" as the device attribute of another first-type logical device, thereby increasing the capacity of the storage pool.

5. The storage system according to claim 2, wherein the control unit is configured to cancel the device attribute of the second first-type logical device whose device attribute has been set to "pool volume attribute", thereby reducing the capacity of the storage pool.

6. The storage system according to claim 5, wherein the control unit:
determines whether the second first-type logical device whose device attribute has been set to "pool volume attribute" is storing data when the device attribute is to be cancelled; and
does not cancel the device attribute of the second first-type logical device whose device attribute has been set to "pool volume attribute" when it is determined that data is stored in the second first-type logical device.

7. The storage system according to claim 2, wherein the control unit is configured to cancel the device attribute of each first-type logical device whose device attribute has been set to "pool volume attribute", thereby eliminating the storage pool.

8. The storage system according to claim 2,
wherein first configuration information including an identifier of the first-type logical device and second configuration information including an identifier of the second-type logical device are provided, and
wherein the control unit stores the identifier of the first-type logical device from the first configuration information in the second configuration information, thereby associating the second-type logical device with the second first-type logical device.

9. The storage system according to claim 8,
wherein the first configuration information further includes an address of the first-type logical device, and identifiers of areas preceding and following the first-type logical device, and
wherein the second configuration information further includes an address of the second-type logical device.

10. The storage system according to claim 2, wherein the control unit provides an association between the virtual volume, a connection port number of a connection port through which the computer accesses the virtual volume, and route information, thereby setting the virtual volume to be accessible by the host computer.

11. The storage system according to claim 2, wherein the control unit:
specifies the type of logical device corresponding to an address designated in a read request upon reception of a data read request from the host computer;
specifies which second first-type logical device is allocated to a second-type logical device, when the specified type of logical device is a second-type logical device; and
reads data designated in the read request from the specified second first-type logical device.

12. The storage system according to claim 2, wherein the control unit:
specifies the type of logical device located at an address designated in a write request, upon reception of a data write request from the computer;
specifies which first-type logical device is allocated to a second-type logical device, when the specified type of logical device is a second-type logical device; and
writes data designated in the write request to the specified first-type logical device.

13. The storage system according to claim 2, wherein the control unit:
specifies the type of logical device located at an address designated in a write request, upon reception of a data write request from the computer; and
allocates a second first-type logical device having a device attribute of "pool volume attribute" to the second-type logical device, when the specified type of logical device is a second-type logical device and when no first-type logical device is allocated to the second-type logical device.

14. The storage system according to claim 2, wherein the control unit:
specifies the type of logical device associated with an address designated in a request, upon reception of the request from the computer; and
rejects the request when the specified type of logical device is a first-type logical device whose device attribute is set to "pool volume attribute".

15. The storage system according to claim 2, wherein the control unit:
upon detection of a failure in one of the plurality of storage devices, blocks a first-type virtual device corresponding to the one of the plurality of storage devices having the failure;
blocks a first-type logical device that is included in the first-type virtual device corresponding to the one of the plurality of storage devices having the failure; and
blocks the first-type logical device, when the device attribute of the first-type logical device is "pool volume attribute".

16. The storage system according to claim 2, wherein the control unit:
stores storage system management information in a second first-type logical device having a device attribute that is set to "pool volume attribute", at the time the power is turned off; and
reads the stored management information to boot the storage system when the power is turned on again after being turned off.

17. The storage system according to claim 2, wherein the control unit:
finds a second first-type logical device other than the second first-type logical devices storing data from among first-type logical devices whose device attribute as been set to "pool volume attribute", at the time the power is turned off;
stores storage system management information in the a second first-type logical device found; and
reads the stored management information to boot the storage system, when the power is turned on again.

18. A method of changing configuration of a storage system connected to a host computer and a management apparatus, the storage system comprising a plurality of storage devices accessed by the host computer and a control unit that controls the storage system, the method comprising:

a first step of setting a first-type virtual device, which includes a plurality of first-type logical devices, and corresponds to plurality of storage devices, wherein the plurality of first type logical devices includes at least one first first-type logical device and at least one second first-type logical device, the at least one first first-type logical device being allocated to a volume accessible by the host computer;

setting a second-type virtual device including a second-type logical device, which is a virtual volume accessed by the host computer; and allocating each second first-type logical device, of the plurality of first-type logical devices, to a storage pool, wherein when the control unit receives first write data for the first first-type logical device included in the first-type virtual device, the control unit stores the first write data in the first first-type logical device, and wherein when the control unit receives second write data for the second-type logical device included in the second-type virtual device, the control unit associates at least one second first-type logical device, of the first-type virtual device allocated to the storage pool, with the second-type logical device; and storing the second write data in the second first-type logical device, wherein the storage system further comprises: a memory storing management information, which includes cache data to be destaged and configuration information regarding the configuration of the respective virtual devices, logical devices and volumes; and a non-volatile memory, and wherein in response to power to the storage system being turned off, the method further includes:

locating an unused area in the storage pool;

assigning the unused portion as a system area;

evacuating the management information stored in the memory to the system area; and storing in the non-volatile memory the address and size of the system area, and wherein in response to the power to the storage system subsequently being turned back on, the method further includes the steps of:

consulting the non-volatile memory to obtain information about the assigned system area where the management information is stored;

reading the management information in the assigned system area;

booting the system; and canceling the assignment of the unused area as a system area.

19. The method according to claim 18, wherein the step of allocating each second first-type logical device further includes:

setting "pool volume attribute" as a device attribute of a second first-type logical device; and allocating an address of the second first-type logical device having the device attribute of "pool volume attribute" to an address of the second-type logical device, thereby allocating the second first-type logical device to the second-type logical device.

20. A storage system coupled to a host computer and a management apparatus, comprising:

a plurality of storage devices accessed by the host computer;

a control unit that controls the plurality of storage devices;

a memory storing management information, which includes cache data to be destaged and configuration information regarding the configuration of respective virtual devices, logical devices and volumes in the storage system; and a non-volatile memory, wherein in response to the power of the storage system being turned off, the storage system:

locates an unused area in the storage pool;

assigns the unused portion as a system area;

evacuates the management information stored in the memory to the system area; and stores in the non-volatile memory the address and size of the system area, wherein in response to the power of the storage system subsequently being turned back on, the storage system:

consults the non-volatile memory to obtain information about the assigned system area where the management information is stored;

reads the management information in the assigned system area;

boots the system; and cancels the assignment of the unused area as a system area.

* * * * *